United States Patent [19]

Ishida et al.

[11] Patent Number: 5,937,117
[45] Date of Patent: Aug. 10, 1999

[54] OPTICAL CROSS-CONNECT SYSTEM

[75] Inventors: Osamu Ishida, Tokyo; Kenichi Sato, Yokohama; Noboru Takachio, Yokosuka, all of Japan

[73] Assignee: Nippon Telegraph and Telephone Corporation, Japan

[21] Appl. No.: 08/996,717

[22] Filed: Dec. 23, 1997

[30] Foreign Application Priority Data

Dec. 27, 1996 [JP] Japan .................................. 8-351247

[51] Int. Cl.$^6$ ....................................................... G02B 6/28
[52] U.S. Cl. ............................................. 385/24; 359/123
[58] Field of Search ..................................... 359/120, 121, 359/127, 128, 123, 117, 135; 385/16, 24, 20, 147

[56] References Cited

FOREIGN PATENT DOCUMENTS

| | | |
|---|---|---|
| 3-219793 | 9/1991 | Japan . |
| 7-162904 | 6/1995 | Japan . |
| 8-149526 | 6/1996 | Japan . |
| 8-298499 | 11/1996 | Japan . |
| 9-23457 | 1/1997 | Japan . |
| 9-247179 | 9/1997 | Japan . |

OTHER PUBLICATIONS

Goldstein, et al. "Scaling limitations in transparent optical network due to low level crosstalk", IEEE Photonics Technology Letters, vol. 7, pp. 93–94, 1995.

T. Kominato, et al. "Guided–wave optical WDM circuits with Mach–Zehnder interferometer configuration", Technical Report of the IEICE, C–1, vol. J73–C–1, No. 5, pp. 354–359, 1990.

O. Ishida, et al. "Parallel–optical–interconnecting multi-wavelength star network (POIMS net) for high–capacity switching", Proceedings of the IEEE Communication Society Meeting, B–1072, p. 557, 1996.

H. Takahashi, et al. "Transmission characteristics of arrayed waveguide N X N wavelength multiplexer", Journal of Lightwave Technology, IEEE, vol. 13, No. 3, pp. 447–455, 1995.

T. Hanada, et al. "8 X 1 Single –mode to multi–mode combiner", Proceedings of the IEEE Electronics Society Meeting, C–160, p. 160, 1996.

S. Nagaoka, "Compact and high–performance latching type single–mode fiber switches", Technical Report of IEICE, OQE93–119, OCS93–55, pp. 67–72, 1993.

R.A. Barry, et al., "Latin Routers, design and implementation", Journal of Lightwave Technology, IEEE, vol. 11, No. 5/6, pp. 891–899, 1993.

Y. Inoue, et al., "Optical splitter/router based on silica–based planar lightwave circuits", Technical Report of IEICE, OPE96–2, pp. 7–12, 1996.

O. Ishida, et al., "Modular cross–connect system for WDM optical–path networks", 11th International Conference on Integrated Optics and Optical Bibre Communications, IEE, vol. 3, pp. 63–66, Sep. 1997.

*Primary Examiner*—Akm E. Ullah
*Attorney, Agent, or Firm*—Pennie & Edmonds LLP

[57] ABSTRACT

An optical cross-connect system which can be constructed using the same kind of optical switches having a small extinction ratio and a small number of optical switch driving circuits is provided. The optical signal selector in the system comprises a first optical switching device for permitting only the wavelength-division multiplexed light beam passing through one of plural optical paths to pass, a wavelength router for demultiplexing the permitted multiplexed light beam into optical signals of different wavelengths and respectively outputting these demultiplexed signals into different output ports, this router having a routing characteristic such that the output port to which each demultiplexed signal is output is different for each input port, a second optical switching device for permitting only one of the optical signals output from plural optical paths connected to the output ports of the wavelength router to pass, and an optical combiner for combining the optical paths of the second optical switching device.

10 Claims, 19 Drawing Sheets

FIG.3

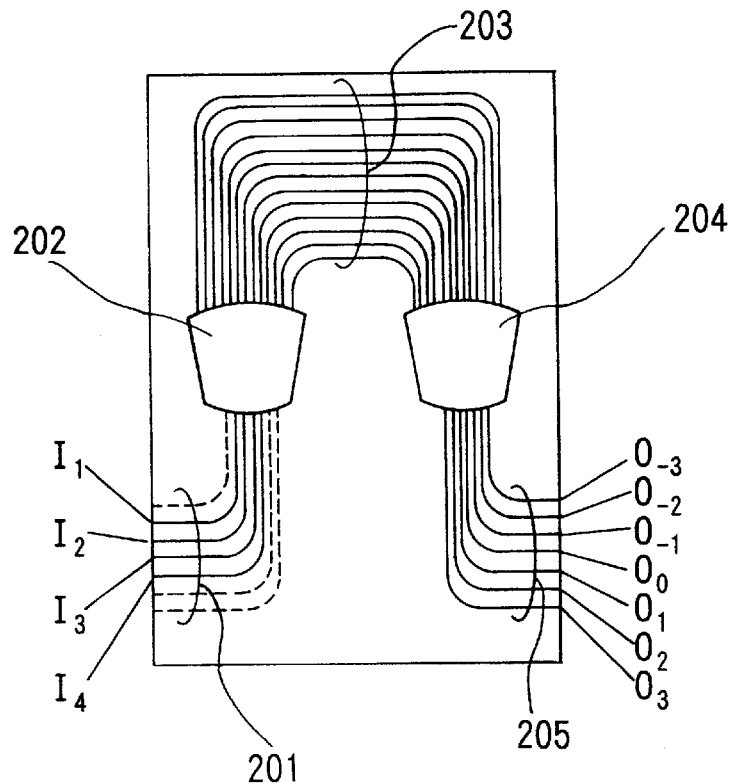

FIG.4

| | OUTPUT WAVEGUIDE | | | | | | |
|---|---|---|---|---|---|---|---|
| | | $O_{-3}$ | $O_{-2}$ | $O_{-1}$ | $O_0$ | $O_1$ | $O_2$ | $O_3$ |
| INPUT WAVEGUIDE | $I_1$ | $\lambda_{-2}$ | $\lambda_{-1}$ | $\lambda_0$ | $\lambda_1$ | $\lambda_2$ | $\lambda_3$ | $\lambda_4$ |
| | $I_2$ | $\lambda_{-1}$ | $\lambda_0$ | $\lambda_1$ | $\lambda_2$ | $\lambda_3$ | $\lambda_4$ | $\lambda_5$ |
| | $I_3$ | $\lambda_0$ | $\lambda_1$ | $\lambda_2$ | $\lambda_3$ | $\lambda_4$ | $\lambda_5$ | $\lambda_6$ |
| | $I_4$ | $\lambda_1$ | $\lambda_2$ | $\lambda_3$ | $\lambda_4$ | $\lambda_5$ | $\lambda_6$ | $\lambda_7$ |

|  | OUTPUT WAVEGUIDE | | | |
|---|---|---|---|---|
|  | $O_0$ | $O_1$ | $O_2$ | $O_3$ |
| INPUT WAVEGUIDE $I_1$ | $\lambda_1$ | $\lambda_2$ | $\lambda_3$ | $\lambda_4$ |
| $I_2$ | $\lambda_2$ | $\lambda$ | $\lambda_4$ | $\lambda_1$ |
| $I_3$ | $\lambda_3$ | $\lambda_4$ | $\lambda_1$ | $\lambda_2$ |
| $I_4$ | $\lambda_4$ | $\lambda_1$ | $\lambda_2$ | $\lambda_3$ |

| | OUTPUT WAVEGUIDE | | | |
|---|---|---|---|---|
| | $O_0$ | $O_1$ | $O_2$ | $O_3$ |
| INPUT WAVEGUIDE $I_1$ | $\lambda_1$ | $\lambda_2$ | $\lambda_3$ | $\lambda_4$ |
| $I_2$ | $\lambda_4$ | $\lambda_3$ | $\lambda_2$ | $\lambda_1$ |
| $I_3$ | $\lambda_2$ | $\lambda_1$ | $\lambda_4$ | $\lambda_3$ |
| $I_4$ | $\lambda_3$ | $\lambda_4$ | $\lambda_1$ | $\lambda_2$ |

FIG.17

| | O₁ | O₂ | O₃ | O₄ | O₅ | O₆ | O₇ | O₈ | O₉ | O₁₀ | O₁₁ |
|---|---|---|---|---|---|---|---|---|---|---|---|
| I₁ | $\lambda_{-6}$ | $\lambda_{-5}$ | $\lambda_{-4}$ | $\lambda_{-3}$ | $\lambda_{-2}$ | $\lambda_{-1}$ | $\lambda_0$ | $\lambda_1$ | $\lambda_2$ | $\lambda_3$ | $\lambda_4$ |
| I₂ | $\lambda_{-5}$ | $\lambda_{-4}$ | $\lambda_{-3}$ | $\lambda_{-2}$ | $\lambda_{-1}$ | $\lambda_0$ | $\lambda_1$ | $\lambda_2$ | $\lambda_3$ | $\lambda_4$ | $\lambda_5$ |
| I₃ | $\lambda_{-4}$ | $\lambda_{-3}$ | $\lambda_{-2}$ | $\lambda_{-1}$ | $\lambda_0$ | $\lambda_1$ | $\lambda_2$ | $\lambda_3$ | $\lambda_4$ | $\lambda_5$ | $\lambda_6$ |
| I₄ | $\lambda_{-3}$ | $\lambda_{-2}$ | $\lambda_{-1}$ | $\lambda_0$ | $\lambda_1$ | $\lambda_2$ | $\lambda_3$ | $\lambda_4$ | $\lambda_5$ | $\lambda_6$ | $\lambda_7$ |
| I₅ | $\lambda_{-2}$ | $\lambda_{-1}$ | $\lambda_0$ | $\lambda_1$ | $\lambda_2$ | $\lambda_3$ | $\lambda_4$ | $\lambda_5$ | $\lambda_6$ | $\lambda_7$ | $\lambda_8$ |
| I₆ | $\lambda_{-1}$ | $\lambda_0$ | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ |
| ... | ... | ... | ... | ... | ... | ... | ... | ... | ... | ... | ... |
| I₁₁ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ |

OUTPUT WAVEGUIDE

INPUT WAVEGUIDE

OPTICAL CROSS-CONNECT SYSTEM

BACKGROUND OF THE INVENTION

1. Field of the Invention

The present invention relates to an optical cross-connect system used for optical wavelength-division multiplexed communication network. This application is based on Japanese Patent Application No. Hei 8-351247, the contents of which are incorporated herein by reference.

2. Description of Related Art

In a wavelength-division multiplexing transmission system, plural optical carriers having different wavelengths are respectively modulated using different signals, and these plural modulated optical carriers (i.e., plural optical signals) are multiplexed to be transmitted through one optical fiber. Therefore, at a junction point to which plural optical fibers are connected, an optical cross-connect system (or system) is necessary which can arbitrarily exchange plural wavelength-division multiplexed optical signals in each optical fiber, not depending on the wavelength of each signal.

FIG. 18 shows an example of the configuration of the conventional optical cross-connect system using the wavelength-division multiplexing techniques. Here, 4 pairs of input-output optical fibers are provided, in each of which 4 optical signals ($\lambda_1$–$\lambda_4$) are wavelength-division multiplexed.

In FIG. 18, reference numerals 11–14 indicate input optical fibers, reference numerals 21–24 indicate 1×4 wavelength-division demultiplexers, reference numeral 30 indicates a 16×16 optical switch, reference numerals 711–744 indicate wavelength converters, reference numerals 81–84 indicate 4×1 wavelength-division multiplexers, and reference numerals 91–94 indicate output optical fibers.

The wavelength-division multiplexed light beams transmitted through input optical fibers 11–14 are respectively demultiplexed via wavelength-division demultiplexers 21–24 according to the wavelengths included in each wavelength-division multiplexed light beam. The 16 optical signals demultiplexed by 4 wavelength-division demultiplexers are introduced into any of 16 wavelength converters 711–744 via optical switch 30. Here, the optical signals introduced into wavelength converters 711–714 are respectively converted into optical signals having predetermined wavelengths of $\lambda_1$–$\lambda_4$, and then multiplexed by wavelength-division multiplexer 81 to be output into output optical fiber 91. Similar operations are performed in other wavelength converters and wavelength-division multiplexers. In this way, it is possible to freely route optical signals (of each wavelength) transmitted through plural input optical fibers to plural output optical fibers, not depending on the original wavelength of each input signal.

However, in the arrangement shown in FIG. 18, if the number of the input-output optical fiber pairs and the number of the different wavelengths is large, it is difficult to construct optical switch 30. In particular, it is difficult to establish divided optical switches in order, for example, to cope with the increase of a pair of input and output fibers each time a demand occurs.

A cross-connect system in which the above problems are solved is disclosed in Japanese Patent Application, First Publication, Hei 3-219793 ("Wavelength division optical exchange"). A brief explanation of this conventional optical crossconnect system will follow. The operational principle of the optical switching part is that wavelength-division multiplexed light beams transmitted through m (m being an integer of 2 or more) input optical fibers are not demultiplexed and are directly distributed into plural m×1 optical switches, and each optical switch selects any one of the wavelength-division multiplexed light beams and any one optical signal (among the multiplexed optical signals) is further selected by a tunable wavelength selector.

FIG. 19 shows an example of the configuration of the conventional optical cross-connect system using such an optical signal selector. Here, 4 pairs of input-output optical fibers are provided, and in each optical fiber, 4 optical signals ($\lambda_1$–$\lambda_4$) are wavelength-division multiplexed.

In FIG. 19, reference numerals 11–14 indicate input optical fibers, reference numerals 31–34 indicate 1×16 optical splitters, reference numerals 511–544 indicate 4×1 optical switches, reference numerals 611–644 indicate tunable wavelength selectors, reference numerals 711–744 indicate wavelength converters, reference numerals 81–84 indicate wavelength-division multiplexers, and reference numerals 91–94 indicate output optical fibers.

Each wavelength-division multiplexed light beam transmitted through input optical fiber 11–14 is split into 16 portions by each optical splitter 31–34 while maintaining the wavelength-division multiplexed state, and split light portions are introduced to 16 optical switches 511–544. For example, one of (16) outputs from each of optical splitters 31–34 is introduced into optical switch 511.

Any one beam output from the optical splitters is selected in each of 4×1 optical switches 511–544, and then in each of tunable wavelength selectors 611–644, a desired optical signal is selected from 4 optical signals which are wavelength-division multiplexed in the selected output. The optical signals selected via optical switches 511–514 and tunable wavelength selectors 611–614 are respectively introduced into corresponding wavelength converters 711–714 where each optical signal is converted into an optical signal having predetermined one of wavelengths $\lambda_1$–$\lambda_4$. The converted (four) signals are multiplexed in wavelength-division multiplexer 81 and the multiplexed light beam is output into output optical fiber 91. In other wavelength converters and wavelength-division multiplexers, similar operations are performed. In this way, optical signals with each (predetermined) wavelength transmitted through plural input optical fibers can freely be routed to plural output optical fibers, not depending on the original wavelengths of the signals.

In the conventional cross-connect system shown in FIG. 19, optical splitters 31–34, optical switches 511–544, and tunable wavelength selectors 611–644 realize functions of wavelength-division demultiplexers 21–24 and optical switch 30 in FIG. 18. The construction of 4×1 optical switches 511–544 is simpler than that of 16×16 optical switch 30. In addition, the optical switches (511–544) and the tunable wavelength selectors (611–644) can be increased by one set for each pair of input and output optical fibers. That is, the optical switches can be increased step by step according to each demand.

However, in the publication, crosstalk with respect to 4×1 optical switches and tunable wavelength selectors of which the optical cross-connect system shown in FIG. 19 consists, or relevant optical switch driving circuits are not examined.

The 4×1 optical switches 511–544 in FIG. 19 can be constructed, as shown in FIG. 20, such that three 2×1 optical switching elements 151–153 are connected in 2-stage tree form. In this construction, when one of four inputs (1–4) is selected, switching operations regarding two 2×1 optical switching elements are necessary. That is, at least one optical switch driving circuit is necessary for each stage (see circuits 311 and 312 in FIG. 20). Generally, $2^P \times 1$ optical switch is constructed such that $2^P-1$ (total number) of 2×1 optical switching elements are connected in p-stage tree form and thus at least p optical switch driving circuits are necessary. Therefore, the size and the consumption power relating to the optical switch driving circuits are increased.

Additionally, optical switches 511–544 select a wavelength-division multiplexed light beam itself; thus, generated crosstalk includes a portion whose wavelength agrees with that of the (later-)selected optical signal. Such a state is shown in FIG. 21. In the figure, the bold arrow shows the passage of the selected wavelength-division multiplexed light beam. If there are crosstalk portions other than the selected multiplexed light beam, whose any wavelength agrees with that of the selected optical signal (refer to dotted arrows), beat noises are generated and the signal-to-noise (S/N) ratio is remarkably lowered. Therefore, high extinction ratios are required for optical switches 511–544.

According to *Reference 1*, Goldstein, et al., *"Scaling limitations in transparent optical network due to low-level crosstalk"*, IEEE Photonics Technology Letters, vol. 7, pp. 93–94, 1995, when a beat noise is generated, crosstalk $\epsilon_b[dB]$ for causing "power penalty" pp [dB] (of sensitivity) at a bit-error rate (BER) is given by:

$$\epsilon_b[dB] = 10 \text{ Log } \{(1-10^{-pp/5})/(4Q^2)\} \tag{1}$$

where Q is a coefficient which is uniquely defined in accordance with the BER, for example, Q=7 at BER $10^{-12}$. Therefore, in order to suppress, for example, the power penalty at BER $10^{-12}$ less than 0.5 dB, it is necessary to suppress the crosstalk to be −30 dB or less. When the function of a 4×1 optical switch is performed using 2×1 optical switching elements connected as 2-stage form, a crosstalk component is added at each stage; thus, it is necessary to keep crosstalk of an optical switch below −33 dB.

On the other hand, for some kinds of optical switches, it may be difficult to realize the above-explained extinction ratio. For example, regarding a 2×1 optical switching element in the form of a silica-waveguide Mach-Zehnder interferometer using a thermo-optic effect, large crosstalk is generated at one of two input ports due to manufacturing defects with respect to the directional coupler. This problem will be briefly explained according to *Reference 2*, T. Kominato, et al., *"Guided-Wave Optical WDM Circuits with Mach-Zehnder Interferometer Configuration"*, Technical Report of the IEICE, C-I, Vol. J73-C-I, No. 5, pp. 354–359, 1990.

FIG. 22 shows a basic configuration of the 2×1 optical switching element in the form of silica-waveguide Mach-Zehnder interferometer. This optical switching element comprises two directional couplers 161 and 162 and two single-mode waveguides 163 and 164 whose lengths are L and L+ΔL, respectively. On one of the waveguides, thin film heater 165 is mounted, by which the temperature of a neighboring area of one waveguide is changed so as to change the effective refractive index via the thermo-optic effect and to perform the switching.

Regarding the above optical switching element, transmission efficiency $T_1$ from port 1 to port 3, and transmission efficiency $T_2$ from port 2 to port 3, are respectively given by:

$$T_1 = [\{(1-k_1)(1-k_2)\}^{1/2} - (k_1 k_2)^{1/2}]^2 + 4\{k_1 k_2(1-k_1)(1-k_2)\}^{1/2} \sin^2(\pi n \Delta L/\lambda_s) \tag{2}$$

$$T_2 = [\{k_2(1-k_1)\}^{1/2} - \{k_1(1-k_2)\}^{1/2}]^2 + 4\{k_1 k_2(1-k_1)(1-k_2)\}^{1/2} 2\cos^2(\pi n \Delta L/\lambda_s) \tag{3}$$

where $k_1$ and $k_2$ are coupling efficiencies of light intensities with respect to directional couplers 161 and 162, "nΔL" indicates an effective optical path difference, and $\lambda_s$ means the wavelength of optical carrier. Here, propagation losses of the waveguides are assumed to be small enough to be omitted.

The coupling efficiencies $k_1$ and $k_2$ of directional couplers 161 and 162 are dependent on the relative refractive index difference and the distance of the two waveguides, and thus due to manufacturing defects thereof, the efficiencies $k_1$ and $k_2$ may depart from their design value 0.5. However, these manufacturing defects affect the two directional couplers almost equally; thus, it is relatively easy to realize the condition "$k_1 = k_2 = k$". In this case, the above formulas (2) and (3) are respectively simplified as:

$$T_1 = (1-2k)^2 + 4k(1-k)\sin^2(\pi n \Delta L/\lambda_s) \tag{4}$$

$$T_2 = 4k(1-k)\cos^2(\pi n \Delta L/\lambda_s) \tag{5}$$

Here, effective optical path difference nΔL of the waveguide is designed to satisfy, for example, formula (6) in a state in which the thin film heater is not activated.

$$n\Delta L = \lambda_s/2 \tag{6}$$

In this case, transmission efficiency $T_1$ from port 1 to port 3, and transmission efficiency $T_2$ from port 2 to port 3, are independent of coupling efficiency k and defined as:

$$T_1 = 1 \tag{7}$$

$$T_2 = 0 \tag{8}$$

That is, when the thin film heater is not activated, this optical switching element outputs light input into port 1, having any wavelength but near $\lambda_s$. In this operation, crosstalk from port 2 does not exist, in principle.

In addition, if the thin film heater is activated to increase the temperature of the neighborhood of one waveguide (164) and the effective refractive index of the waveguide is changed so as to change the effective optical path difference nΔL as below:

$$n\Delta L = \lambda_s \tag{9},$$

transmission efficiency $T_1$ from port 1 to port 3, and transmission efficiency $T_2$ from port 2 to port 3, are respectively defined as:

$$T_1 = (1-2k)^2 \tag{10}$$

$$T_2 = 4k(1-k) \tag{11}$$

Therefore, by activating the thin film heater, this optical switching element chooses and outputs an optical signal input into port 2. However, if coupling efficiency k in this situation does not accurately agree with 0.5, crosstalk $(1-2k)^2$ is generated from port 1. The above Reference 2 reports that if the distance between the two waveguides has, for example, 20% error (with respect to a design value) due to manufacturing defects, such crosstalk is worsened to approximately −16 dB.

On the other hand, FIG. 23 shows a construction of the tunable wavelength selector sometimes used in a conventional optical cross-connect system, where a wavelength-division multiplexed light beam is demultiplexed by wavelength-division demultiplexer 601 and one of the demultiplexed optical signals is selected and output via 4×1 optical switch 602. In FIG. 23, the bold arrow indicates the passage of the selected optical signal. When 4×1 optical switch 602 is constructed using 2×1 optical switching elements in multi-stage tree form, the size and the consumption power relating to the optical switch driving circuits are also large in this case.

However, optical switch 602 selects one from demultiplexed portions; thus, the crosstalk does not include a portion having a wavelength which agrees with that of the selected optical signal. In this case, no beat noise is generated. Therefore, regarding the power penalty due to the crosstalk, only an influence as the intensity noise should be considered. In this case, crosstalk $\epsilon_i$ [dB] for causing power penalty pp [dB] (of sensitivity) at a bit-error rate (BER) is given by:

$$\epsilon_i[dB]=5 \log\{(1-10^{-pp/5})/Q^2\} \qquad (12)$$

Therefore, in order to suppress the power penalty, for example, at BER $10^{-12}$ less than 0.5 dB, it is necessary to suppress the crosstalk to be −12 dB or less. When the function of 4×1 optical switch is realized using 2×1 optical switching elements connected in 2-stage form, it is necessary to keep crosstalk of each optical switching element to −15 dB or less.

As explained above, in the conventional optical cross-connect system, optical switches with a high extinction ratio must be selectively used for switches 511–544; thus, the cost becomes high. Additionally, if the tunable wavelength selector is also constructed using an optical switch, as explained with reference to FIG. 23, the system includes two different kinds of optical switches so as to meet the requirements for different extinction ratio levels. Therefore, integration of optical switches is difficult, and thus reductions of the size and the cost are also difficult. Furthermore, the number of necessary optical switch driving circuits is large. Therefore, the size and the consumption loss become large and thus miniaturization of the system may be impossible.

SUMMARY OF THE INVENTION

It is an object of the present invention to provide an economical optical cross-connect system in which complicated m×1 optical switches are unnecessary; instead, only simple gate optical switches are used and an extinction ratio of each optical switch may be low, and the system being operated by a smaller number of optical switch driving circuits.

Therefore, the present invention provides an optical cross-connect system for re-multiplexing optical signals in a wavelength-division multiplexed light beam transmitted through each of m input optical fibers and for outputting the remultiplexed light beams into m output optical fibers, m being an integer of 2 or more, the system comprising:

(1) optical splitters, each splitter for splitting the wavelength-division multiplexed light beam, which was input from each input fiber, into plural wavelength-division multiplexed light beams;

(2) optical signal selectors to which the plural wavelength-division multiplexed light beams split by the optical splitters are input, the wavelength-division multiplexed light beam from each of the m input optical fibers being input into each optical signal selector, the selector for selecting one of m input wavelength-division multiplexed light beams and further selecting and outputting an optical signal having a wavelength from the selected wavelength-division multiplexed light beam;

(3) wavelength converters, each converter for converting the optical signal, which was output from each optical signal selector, into an optical signal with a predetermined wavelength; and (4) wavelength-division multiplexers, respectively connected to the m output optical fibers, for wavelength-division multiplexing optical signals output from the wavelength converters and respectively outputting multiplexed light beams to the output optical fibers.

Each optical signal selector comprises:

(2-1) a first optical switching means having m optical paths which correspond to the m wavelength-division multiplexed light beams, for permitting only the wavelength-division multiplexed light beam passing through one of the optical paths to pass and closing the remaining paths;

(2-2) a wavelength router having m input ports which are respectively connected to the m optical paths and p output ports, p being an integer of the number of wavelengths multiplexed in the wavelength-division multiplexed light beam or more, the router for demultiplexing the wavelength-division multiplexed light beam, which passed through the first optical switching means, into optical signals having different wavelengths, and for respectively outputting these demultiplexed optical signals into different output ports, the router having a routing characteristic such that the output port to which each demultiplexed signal is output is different for each input port;

(2-3) a second optical switching means having p optical paths which are connected to the p output ports of the wavelength router, for permitting only the optical signal passing through one of the optical paths to pass and closing the remaining paths; and (2-4) optical combiner for combining the p optical paths of the second optical switching means into one optical path.

According to the above structure, in each optical signal selector, only one wavelength-division multiplexed light beam is selected via the first optical switching means, and only one optical signal is selected from the above wavelength-division multiplexed light beam via the second optical switching means. Therefore, it is possible to reduce the number of driving circuits relating to the switching operation (to "2"); thus, the size and the consumption power with respect to the driving circuits can be reduced.

Additionally, among crosstalk components due to the m optical paths (or optical waveguides) in the first optical switching means, components having the same wavelength as that of the optical signal selected by the second optical switching means are introduced into different optical paths (or optical waveguides from the optical path for the selected signal) of the second optical switching means by the wavelength router; thus, no beat noise is generated. In this way, both the first and second optical switching means can be constructed using optical switches with a low extinction ratio. Additionally, both the optical switching means have plural optical paths and have a common function of opening only one of the paths for allowing a light beam to pass; thus, these means can be constructed using the same kinds of optical switches. Accordingly, it is easy to realize integration and the reduction of size and consumption power can also be realized.

Here, a technique for suppressing the beat noise using a combination of the first switching means and the wavelength router is disclosed in *Reference* 3, *O. Ishida, et al., "Parallel-Optical-Interconnecting Multiwavelength Star Network (POIMS Net) for High-Capacity Switching", Proceedings of the IEEE Communication Society Meeting, B-1072, p. 557, 1996.*

This Reference 3 discloses plural optical splitters, first optical switching means having optical paths which are connected to each output of the optical splitters, a wavelength router having input ports which are respectively connected to the above optical paths, and plural optical receivers which are respectively connected to plural output ports of the wavelength router. Similar structure is also disclosed in detail, in Japanese Patent Application, First Publication, Hei 9-247179 ("Optical receiver and optical network using the receiver").

Accordingly, in the present invention, a novel optical signal selector, different from the conventional (combination of) m×1 optical switch and tunable wavelength selector (m=4 in the configuration of FIG. 19), is realized by adding the second optical switching means and the optical combiner to the first optical switching means and the wavelength router. That is, the combination of the first switching means and the wavelength router does not originally function as an m×1 optical switch; however, by skillfully using a routing characteristic of the wavelength router and adding the function of the tunable wavelength selector, such a structure can function as the optical signal selector.

BRIEF DESCRIPTION OF THE DRAWINGS

FIG. 3 shows a configuration of arrayed-waveguide grating wavelength router 200.

FIG. 4 shows the wavelength-routing characteristics of arrayed-waveguide grating wavelength router 200.

FIG. 17 shows the wavelength-routing characteristic of the 11×11 arrayed-waveguide grating wavelength router.

DESCRIPTION OF THE PREFERRED EMBODIMENTS

Basic configuration of the optical cross-connect system

Figure 1:
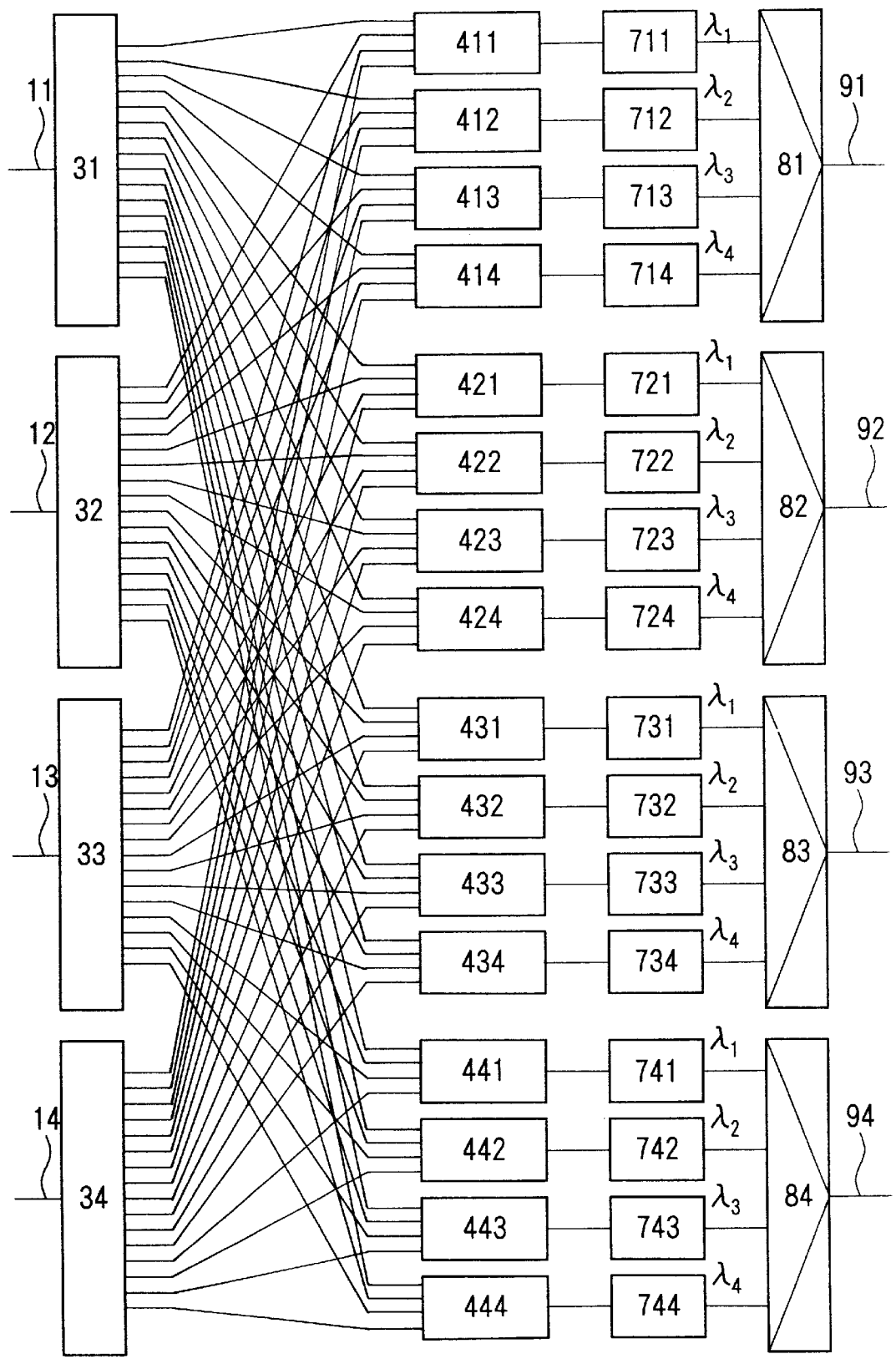
FIG. 1 shows a basic configuration of an optical cross-connect system according to the present invention.

FIG. 1 shows a basic configuration of an optical cross-connect system according to the present invention.

In the optical cross-connect system, 4 pairs of input-output optical fibers are connected and four optical signals of different wavelengths are wavelength-division multiplexed in each optical fiber.

In FIG. 1, reference numerals 11–14 indicate input optical fibers, reference numerals 31–34 indicate 1×16 optical splitters, reference numerals 411–444 indicate optical signal selectors, reference numerals 711–744 indicate wavelength converters, reference numerals 81–84 indicate 4×1 wavelength-division multiplexers, and reference numerals 91–94 indicate output optical fibers.

The wavelength-division multiplexed light beams transmitted through input optical fibers 11–14 are respectively split into 16 portions by each optical splitter 31–34 while maintaining the wavelength-division multiplexed state, and are introduced into optical signal selectors 411–444. For example, one of (16) outputs from each of optical splitters 31–34 is introduced into optical signal selector 411.

Optical signals selected by optical signal selectors 411–414 are introduced into wavelength converters 711–714 where the optical signals are converted into optical signals having predetermined wavelengths $\lambda_1$–$\lambda_4$, and the converted signals are multiplexed in wavelength-division multiplexer 81 to be output into output optical fiber 91. In other wavelength converters and wavelength-division multiplexers in the system, similar operations are performed.

Embodiment 1 of configuration of the optical signal selector

Figure 2:
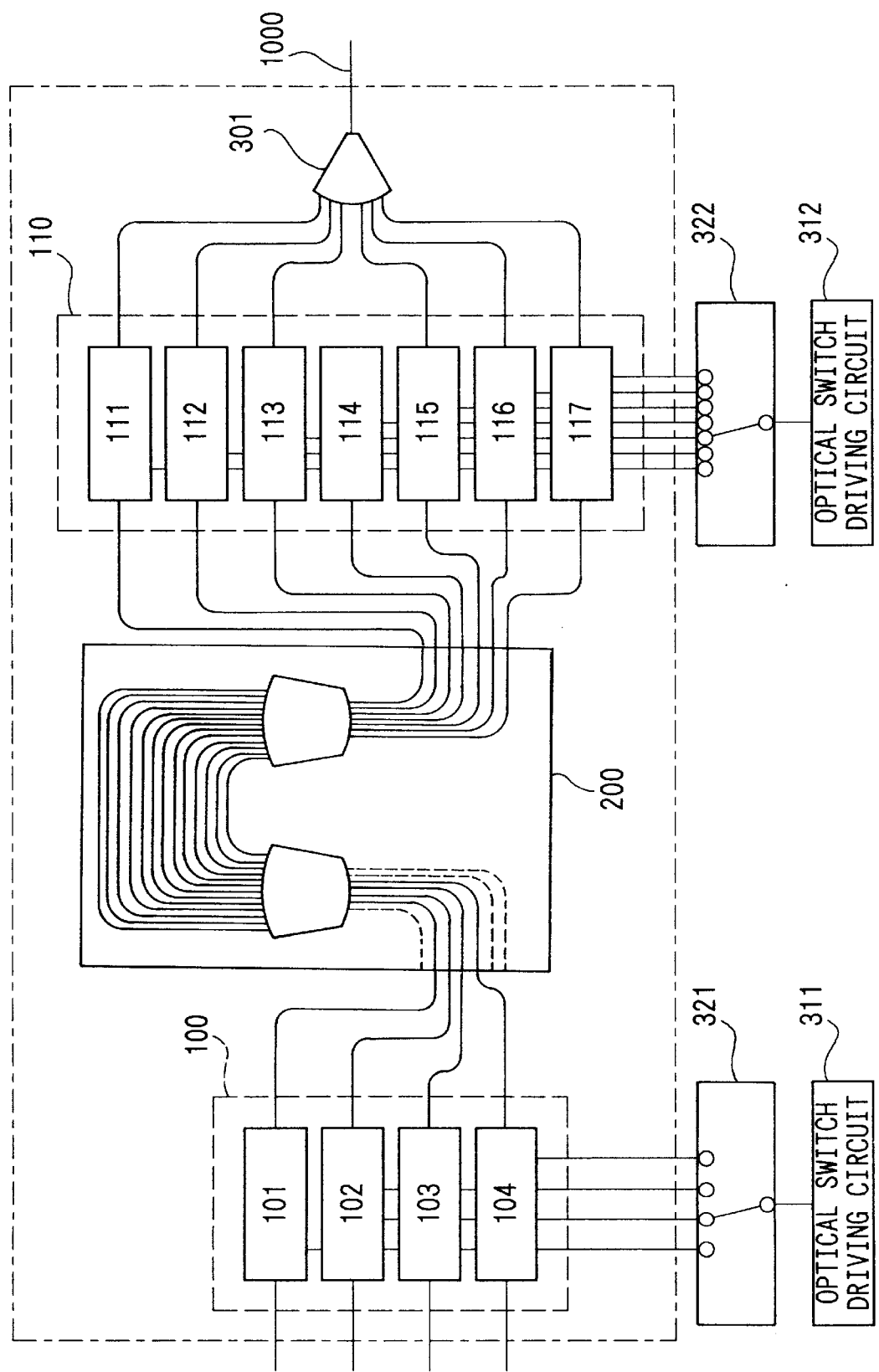
FIG. 2 shows the first embodiment of the configuration of the optical signal selector.

FIG. 2 shows the first embodiment of the optical signal selector as a distinctive feature of the present invention.

Figure 22:
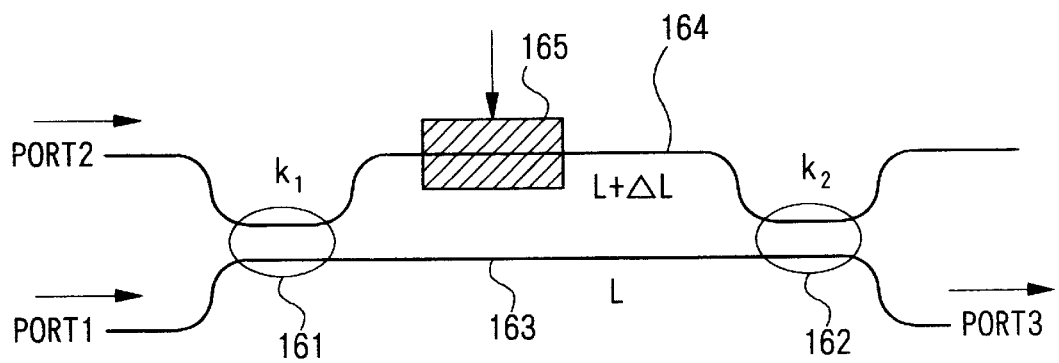
FIG. 22 shows a basic configuration of the 2×1 optical switching element in the form of silica-waveguide Mach-Zehnder interferometer.
Figure 23:
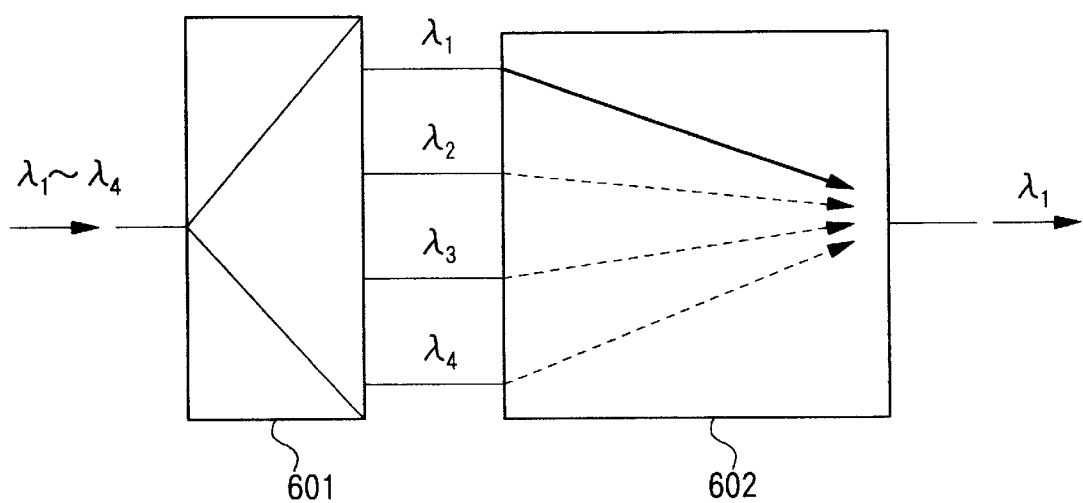
FIG. 23 shows an example of the configuration of the tunable wavelength selectors 611–644 and crosstalk thereof.

In FIG. 2, the optical signal selector comprises optical switching element array 100, arrayed-waveguide grating wavelength router 200, optical switching element array 110, 7×1 optical mode combiner 301, optical switch driving circuits 311 and 312, and selectors 321 and 322. On the other hand, optical switching element arrays 100 and 110, respectively, consist of 4 optical switching elements 101–104 and 7 optical switching elements 111–117. Each optical switching element has a construction as shown in FIG. 22, in which a thin film heater is mounted on one of two waveguides of the Mach-Zehnder interferometer and these optical switching elements are activated (or driven) by optical switch driving circuits 311 and 312 via selectors 321 and 322.

FIG. 3 shows a configuration of arrayed-waveguide grating wavelength router 200. This wavelength router comprises at least 4 input waveguides ($I_{-4}$–$I_4$) 201, first slab waveguide 202, waveguide array 203, whose lengths being respectively different by specified values, second slab waveguide 204, and 7 output waveguides ($O_{-3}$–$O_3$) 205.

For example, in optical signal selector 411 in FIG. 1, one of plural outputs from each optical splitter 31–34 is input into port 2 (refer to FIG. 22) of the corresponding optical switching element (i.e., one of switching elements 101–104) in FIG. 2 (the following explanation will be based on the Mach-Zehnder-interferometer-type 2×1 optical switching element). Port 3 of each of optical switching elements 101–104 is connected to one of input waveguides 201 of arrayed-waveguide grating wavelength router 200. Simultaneously, 7 output waveguides ($O_{-3}$–$O_3$) 205 of arrayed-waveguide grating wavelength router 200 are respectively connected to ports 2 of optical switching elements 111–117. The ports 3 of these elements 111–117 are respectively introduced to 7 inputs of optical mode combiner 301 and the output thereof thus becomes an output of optical signal selector 411.

Hereinafter, operations of each part of the optical signal selector shown in FIG. 2 will be explained.

Optical switch driving circuit 311 activates the thin film heater of one of 4 optical switching elements 101–104, which has been selected by selector 321, and introduces the wavelength-division multiplexed light beam, which was input into port 2 of the selected optical switching element, into port 3. In this operation, the thin film heaters of the remaining three optical switching elements are not activated; thus, no wavelength-division multiplexed light beam is output into ports 3 of these optical switching elements. In this way, the wavelength-division multiplexed light beam is input into only one of input waveguides 201 of arrayed-waveguide grating wavelength router 200.

Here, arrayed-waveguide grating wavelength router 200 is designed in a manner such that when an optical signal of wavelength $\lambda_k$ (k=1–4) is input into input waveguide $I_i$(i= 1–4), the optical signal is routed to output waveguide $O_{k-i}$ (refer to Reference 4, H. Takahashi, et al., "*Transmission Characteristics of Arrayed Waveguide N×N Wavelength Multiplexer*", *Journal of Lightwave Technology, IEEE, Vol.*13, *No.*3, pp. 447–455, 1995). That is, the arrayed-waveguide grating wavelength router 200 has a routing characteristic as shown in FIG. 4. For example, when a wavelength-division multiplexed light beam is input into input waveguide $I_2$, the multiplexed light beam is demultiplexed into plural optical signals and an optical signal having wavelength $\lambda_1$ is output into output waveguide $O_{-1}$; an optical signal shaving wavelength $\lambda_2$ is output into output waveguide $O_0$; an optical signal having wavelength $\lambda_3$ is output into output waveguide $O_1$; and an optical signal having wavelength $\lambda_4$ is output into output waveguide $O_2$. Therefore, a wavelength-division multiplexed light beam (having wavelengths $\lambda_1$–$\lambda_4$) which was input into one of 4 input waveguides is demultiplexed into optical signals which are respectively output into 4 of 7 output waveguides in accordance with the relevant input waveguide and wavelengths (see shaded parts in FIG. 4).

Optical switch driving circuit 312 activates the thin film heater of one of 7 optical switching elements 111–117, which has been selected by selector 322, and introduces the optical signal, which was input into port 2 of the selected optical switching element, into port 3 of the element. In this operation, the thin film heaters of the remaining six optical switching elements are not activated; thus, no optical signal is output from these optical switching elements. In this way, the (selected) optical signal is input into only one of 7 input waveguides of optical mode combiner 301.

The optical mode combiner 301 is an optical device for combining optical signals, which were transmitted through 7 single-mode optical fibers, into one multi-mode optical fiber. The structure thereof is disclosed, for example, in Reference 5, T. Hanada, et al., "*8×1 Single-Mode to Multi-Mode Combiner*", *Proceedings of the IEEE Electronics Society Meeting, C*160, p. 160, 1996. The coupling loss between each single-mode optical fiber and the multi-mode optical fiber can be 2 dB or less.

As explained above, the optical signal selector selects and outputs any one of the total 16 optical signals transmitted through 4 input optical fibers by (i) selecting one of 4 input optical fibers using optical switching element array 100, (ii) demultiplexing a wavelength-division multiplexed light beam transmitted through the selected input optical fiber according to the relevant input port and wavelengths, using arrayed-waveguide grating wavelength router 200, and (iii) selecting one of the optical signals (obtained by the demultiplexing) using optical switching element array 110 and introducing the selected signal into multi-mode optical fiber 1000 which is the output of optical mode combiner 301.

The above-explained embodiment relates to an optical cross-connect system in which at most 4 optical signals are multiplexed in each of 4 pairs of input-output optical fibers. Similarly, it is possible to realize an optical cross-connect system in which at most n optical signals are multiplexed in each of m pairs of input-output optical fibers.

This (general) optical cross-connect system comprises m(1×(m·n) optical splitters) corresponding to m input optical fibers, m·n optical signal selectors, m·n wavelength converters, and m(n×1 wavelength-division multiplexers) corresponding to m output optical fibers.

In this case, each optical signal selector includes a first optical switching element array consisting of m optical switching elements, an arrayed-waveguide grating wavelength router, a second optical switching element array consisting of m+n−1 optical switching elements, and a (m+n−1)×1 optical mode combiner.

Also in this case, the arrayed-waveguide grating wavelength router comprises m input waveguides $I_1$–$I_m$, m+n−1 output waveguides $O_{1-m}$–$O_{n-1}$ and is designed such that when an optical signal of $\lambda_k$ (k=1–n) is input into input waveguide $I_i$ (i=1–m), the input signal is routed to output waveguide $O_{k-i}$. In this operation, a wavelength-division multiplexed light beam (of n optical signals) input into one of the m input waveguides is demultiplexed and output into n of the m+n−1 output waveguides in accordance with the relevant input waveguide and each wavelength.

Hereinbelow, advantages of the optical signal selector as shown in FIG. 2 will be explained.

First, only one input port and one output port are used in each optical switching element. Therefore, in the conventional Mach-Zehnder-interferometer-type 2×1 optical switching element as explained with reference to FIG. 22, it is possible to use only port 2 in which no crosstalk occurs in principle without using port 1 in which crosstalk easily occurs due to a manufacturing defect. Accordingly, it is unnecessary to selectively use an optical switching element whose extinction ratio is not lowered due to a manufacturing defect; thus, the yield rate is substantially improved and manufacturing costs can be reduced.

Figure 5:
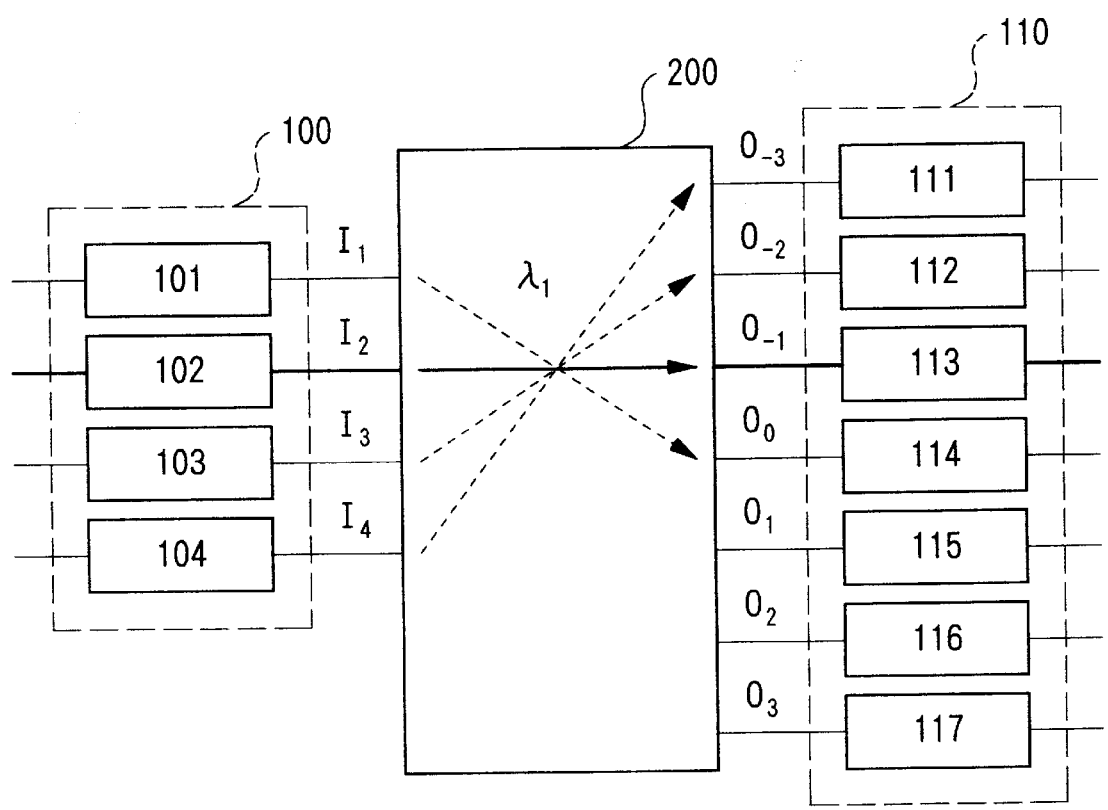
FIG. 5 is a diagram for explaining the principle of suppressing (generation of) beat noises by arrayed-waveguide grating wavelength router 200.

In addition, among crosstalk components generated in optical switching element array 100, components having the same wavelength as that of the optical signal selected by optical switching element array 110 are wavelength-division demultiplexed via arrayed-waveguide grating wavelength router 200; thus, no beat noise occurs. Such a state is schematically shown in FIG. 5. Here, optical switching elements 102 and 113 are activated and an optical signal of wavelength $\lambda_1$ transmitted through input optical fiber 12 is selected.

Figure 21:
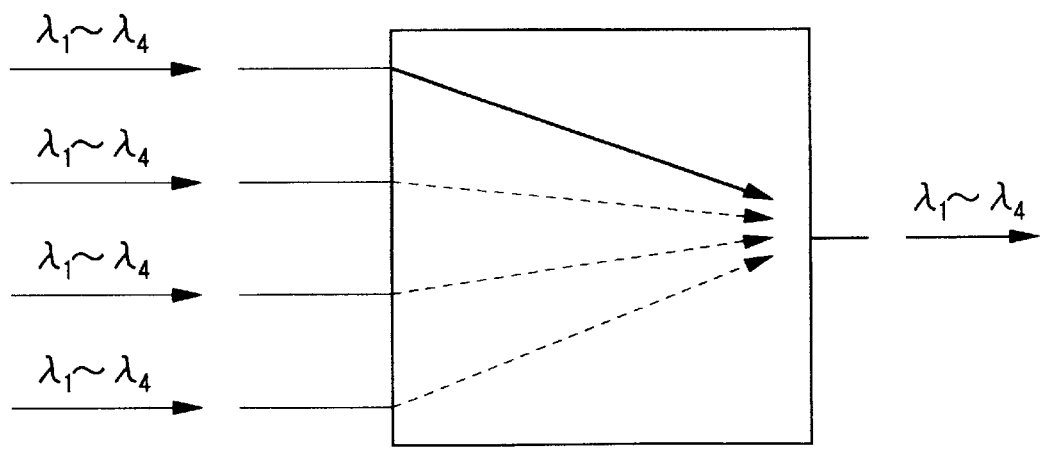
FIG. 21 is a diagram for explaining crosstalk generated at 4×1 optical switches 511–544.

In this case, components transmitted through optical switching elements which have not been activated become crosstalk. That is, crosstalk components in optical switching element array 100 are introduced from optical switching elements 101, 103, and 104 into input waveguides $I_1$, $I_3$, and $I_4$ of arrayed-waveguide grating wavelength router 200. Components having wavelength $\lambda_1$ among these crosstalk components are routed from output waveguides $O_0$, $O_{-2}$, and $O_{-3}$ of arrayed-waveguide grating wavelength router 200 to optical switching elements 114, 112, and 111 and are never routed to activated optical switching element 113. As explained above, crosstalk components having the same wavelength as that of the selected optical signal do not overlap each other; thus, no beat noise occurs. Therefore, the present embodiment differs from the conventional example explained with reference to FIG. 21 and optical switching element array 100 does not require a high extinction ratio.

In FIG. 5, regarding crosstalk component $e_1$ for each optical switching element included in optical switching element array 100 and crosstalk component $e_2$ for each optical switching element included in optical switching element array 110, crosstalk having the same wavelength as that of the selected optical signal is represented as "$(m-1) \cdot e_1 \cdot e_2$" (m indicates the number of pairs of the input-output optical fibers). In order to keep this −30 dB or less in the case of "m=4", condition "$e_1 = e_2 < -18$ dB" should be achieved.

Crosstalk relating to different wavelengths is represented as:

$$(m-1) \cdot e_1 + (n-1) \cdot e_2 + (m-1) \cdot (n-1) \cdot e_1 \cdot e_2$$

where n indicates the number of wavelengths. In order to keep this −12 dB or less in the case of "n=4", condition "$e_1 = e_2 < -20$ dB" should be achieved. Accordingly, with the condition "$e_1 = e_2 < -20$ dB" applied to the configuration shown in FIG. 5, the power penalty at BER $10^{-12}$ can be kept below approximately 0.5 dB.

Furthermore, in the necessary operations of the optical signal selector as shown in FIG. 2, any one of the optical switching elements in each of the optical switching element arrays 100 and 110 is activated to be in an "on" state. Therefore, only two optical switch driving circuits are necessary, and thus the size and the consumption power can be made small.

Figure 6:
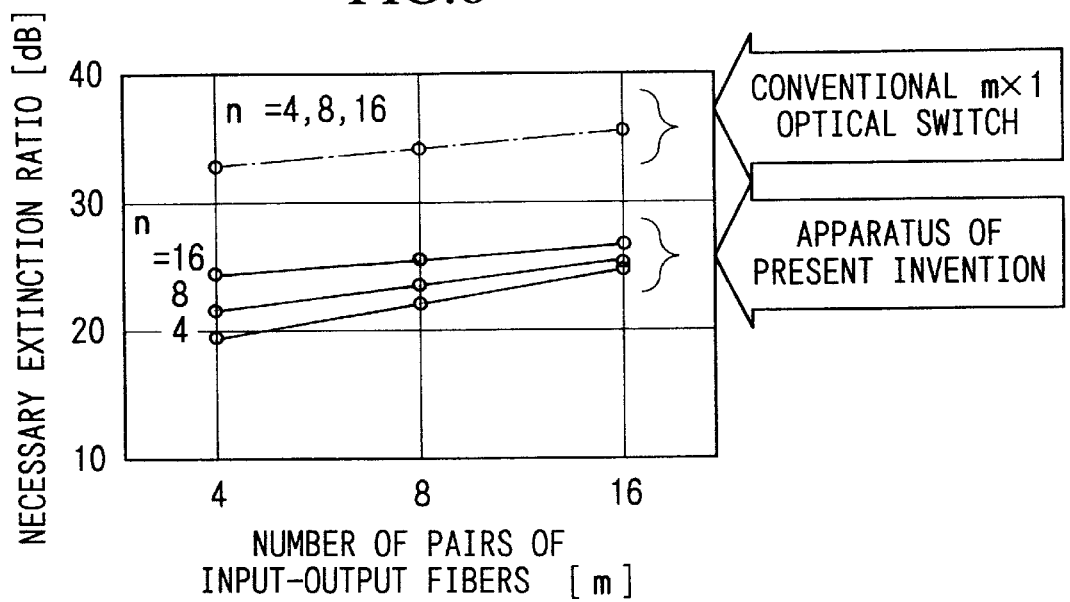
FIG. 6 shows examples of necessary extinction ratios calculated for each optical switching element.
Figure 7:
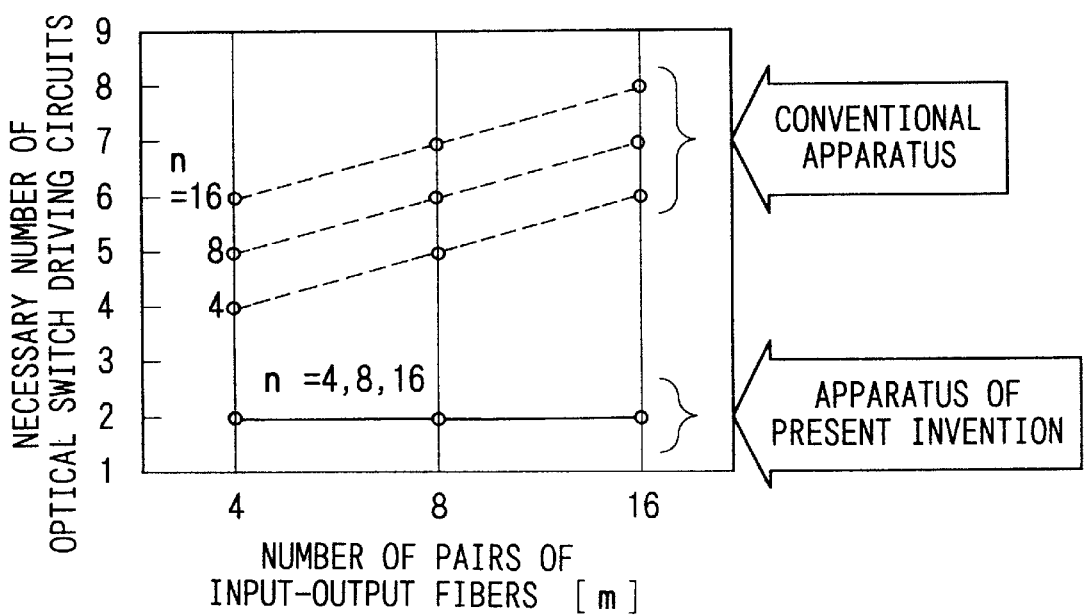
FIG. 7 shows examples of necessary numbers of optical switch driving circuits.
Figure 19:
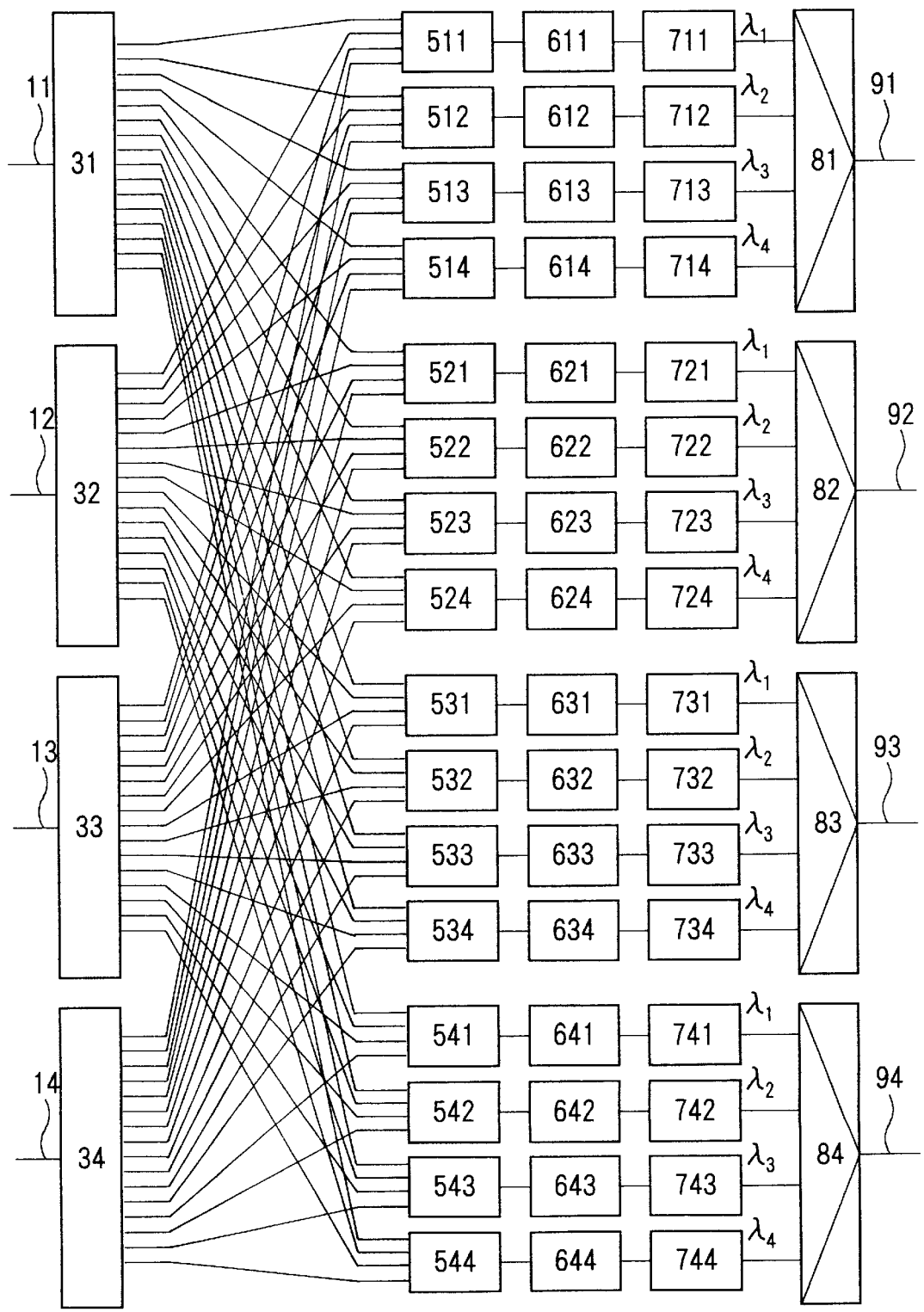
FIG. 19 shows an example of the configuration of the conventional optical cross-connect system using an optical signal selector.
Figure 20:
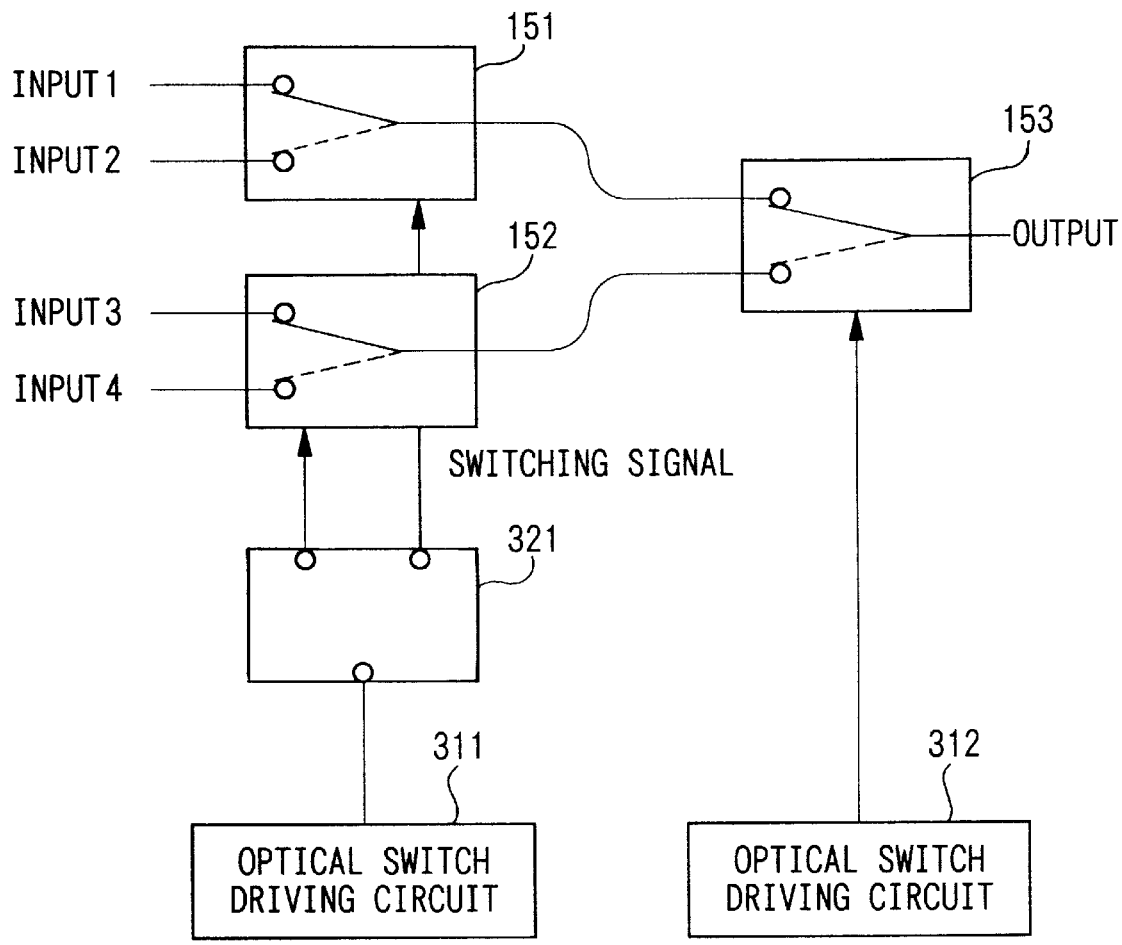
FIG. 20 shows an example of the configuration of 4×1 optical switches 511–544.

Regarding various values for the above m and n relating to the optical signal selector according to the present invention, (i) the extinction ratio necessary for an optical switching element and (ii) the number of necessary optical switch driving circuits were calculated. The obtained results are respectively shown in FIGS. 6 and 7. For comparison, the extinction ratio and the number of optical switch driving circuits necessary for a conventional optical cross-connect system as shown in FIG. 19 designed using 2×1 optical switching elements were also calculated and shown. In these figures, n indicates the number of wavelengths with respect to each optical fiber. As shown in FIG. 6, the required extinction ratio for an optical switching element is relaxed by approximately 10 dB. Moreover, as shown in FIG. 7, the number of necessary optical switch driving circuits is two regardless of the number m of the pairs of input-output optical fibers and the number n of the wavelengths; thus, the size and consumption power can be made small.

Other embodiments of configuration of the optical splitter

Figure 8:
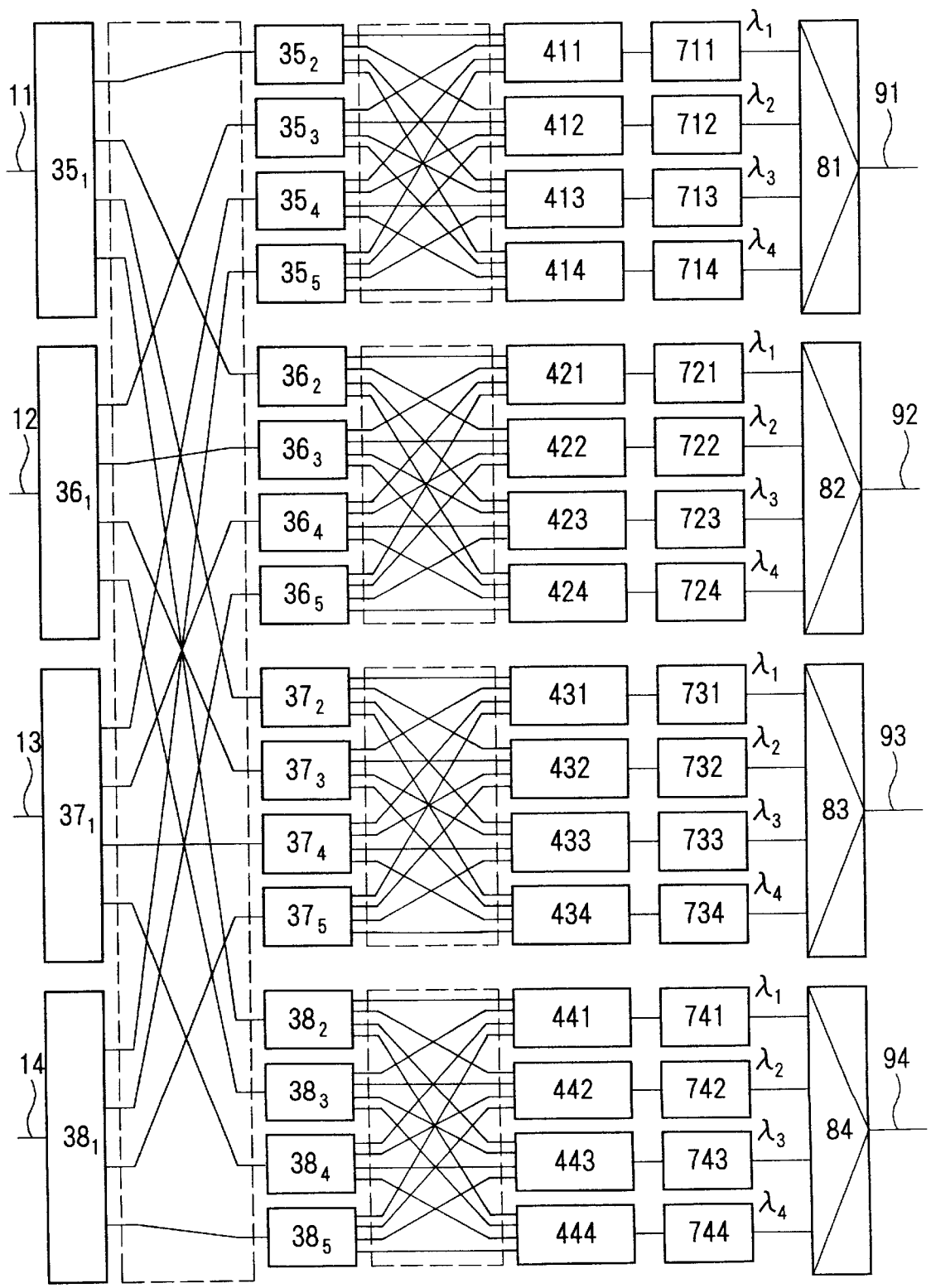
FIG. 8 shows a configuration in which 1×16 optical splitters 31–34 in FIG. 1 are divided.

FIG. 8 shows a configuration in which 1×16 optical splitters 31–34 (in FIG. 1) are divided. In this configuration, each of the 1×16 optical splitters 31–34 is replaced with five 1×4 optical splitters (see reference numerals $35_1$–$35_5$, $36_1$–$36_5$, $37_1$–$37_5$, and $38_1$–$38_5$. Generally, (the function of) a 1×(m·n) optical splitter can be realized using a 1×m optical splitter and m(1×n optical splitters). In this case, optical connection between the input optical fibers and each optical signal selector become simpler. Additional advantage can be obtained in this case, in which for each pair of input-output optical fibers, necessary optical splitters and the relevant optical connection can be established.

Figure 24:
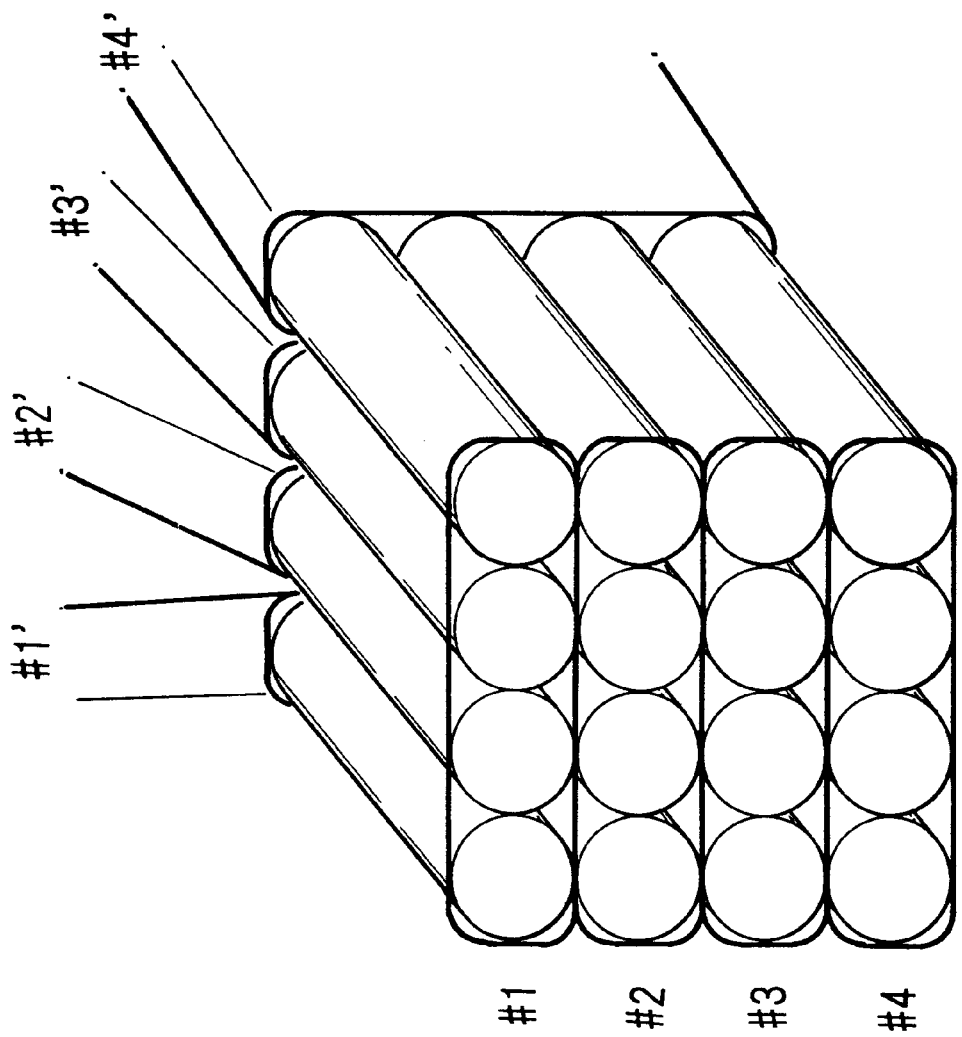
FIG. 24 is an embodiment of the optical connection using a two-dimensional fiber array comprising tape-type 4-core optical fibers.

Next, FIG. 24 shows an embodiment of the optical connection with respect to each of five box areas surrounded by dotted lines in FIG. 8. Four tape-type 4-core optical fibers (#1–#4) are layered so as to construct a two-dimensional fiber array, and by connecting two sets of the two-dimensional fiber arrays (#1–#4 and #1'–#4') such that tape directions of the two sets are at 90 degrees with respect to each other, the above-mentioned necessary connection can be easily realized.

Generally, desirable optical connection can be easily obtained if a (first) two-dimensional fiber array formed by layering m(tape-type n-core optical fibers) at the input side and a (second) two-dimensional fiber array formed by layering n(tape-type m-core optical fibers) at the output side are connected such that tape (i.e., layer) directions of the two arrays form 90 degrees, that is, cross each other in an essentially orthogonal relationship.

Figure 25:
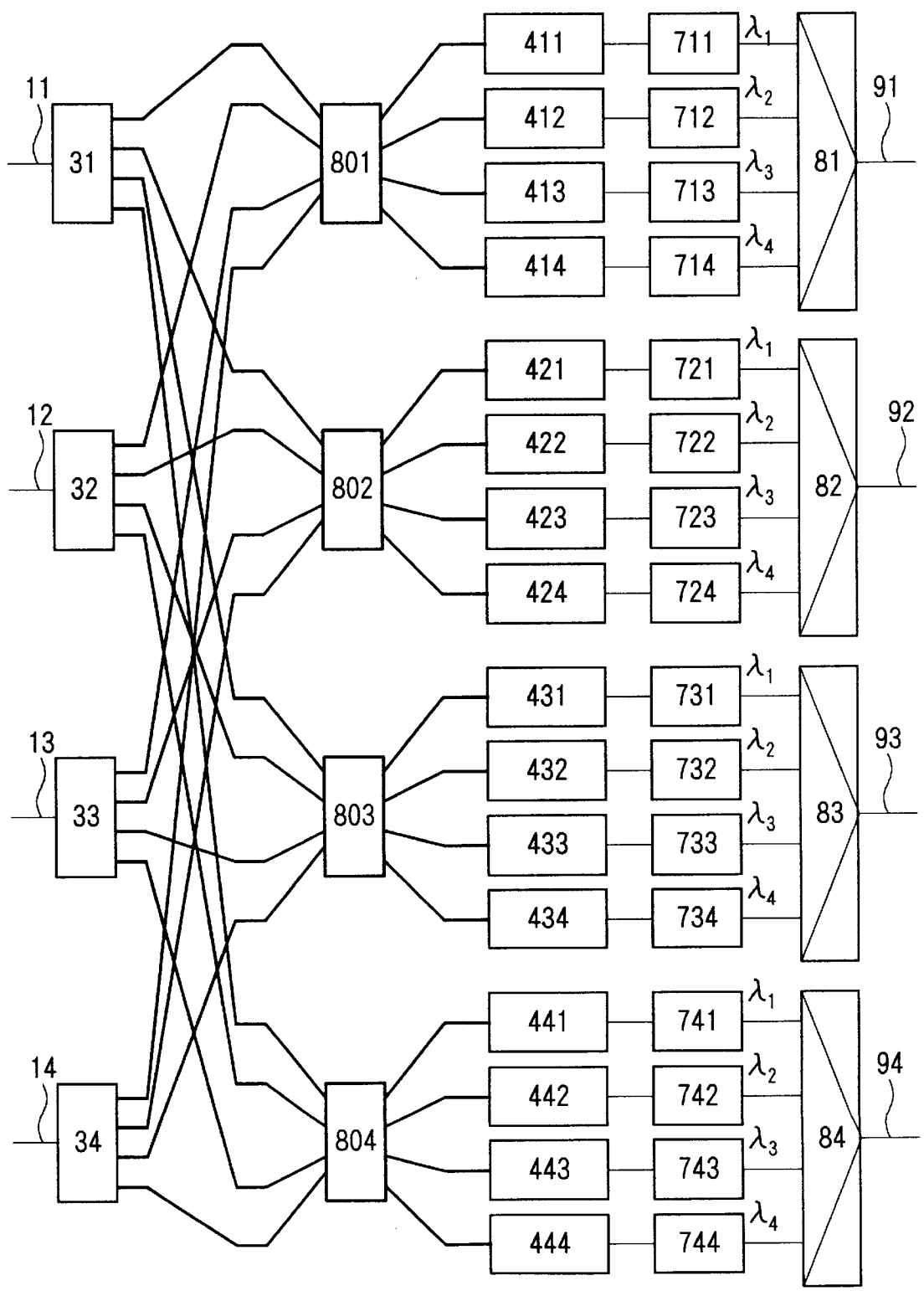
FIG. 25 is an embodiment of the optical connection using the two-dimensional fiber arrays comprising tape-type 4-core optical fibers between the optical splitters and the optical signal selectors in FIG. 1.

Instead of using a large number of 1×4 optical splitters (as shown in FIG. 8) in place of 1×16 optical splitters 31–34 in FIG. 1, another connection arrangement is shown in FIG. 25, in which the 1×16 optical splitters 31–34 and two-dimensional fiber arrays 801–804 (having the above-explained construction) are provided. Here, the outputs of each of the 1×16 optical splitters 31–34 are formed with four tape-type 4-core optical fibers, and by establishing optical connection as shown in FIG. 25, a tape-type 4-core optical fiber is connected to each of optical signal selectors 411–444. That is, by using the two-dimensional fiber arrays 801–804, simpler optical connection for easy (new) installation can be realized without dividing a 1×16 optical splitter into many 1×4 optical splitters, and without causing increase of excessive loss in connection with the increase of the number of division of the optical splitters.

Embodiments of configuration of the wavelength converter

To convert an input optical signal with any wavelength into an optical signal with a predetermined wavelength is a function necessary for wavelength converters 711–744. As the wavelength converter, for example, (i) an optical regenerative repeater in which an optical transmitter is driven using an electric signal which was discriminated and regenerated in an optical receiver, or (ii) an all-optical repeater using semiconductor (elements) may be used. If a common light source for generating plural optical carriers with different wavelengths and distributing these outputs to each wavelength converter is provided, the wavelength converter may be constructed using an optical receiver and an optical modulator for modulating the distributed optical carriers. An example of this configuration is shown in FIG. 9.

Figure 9:
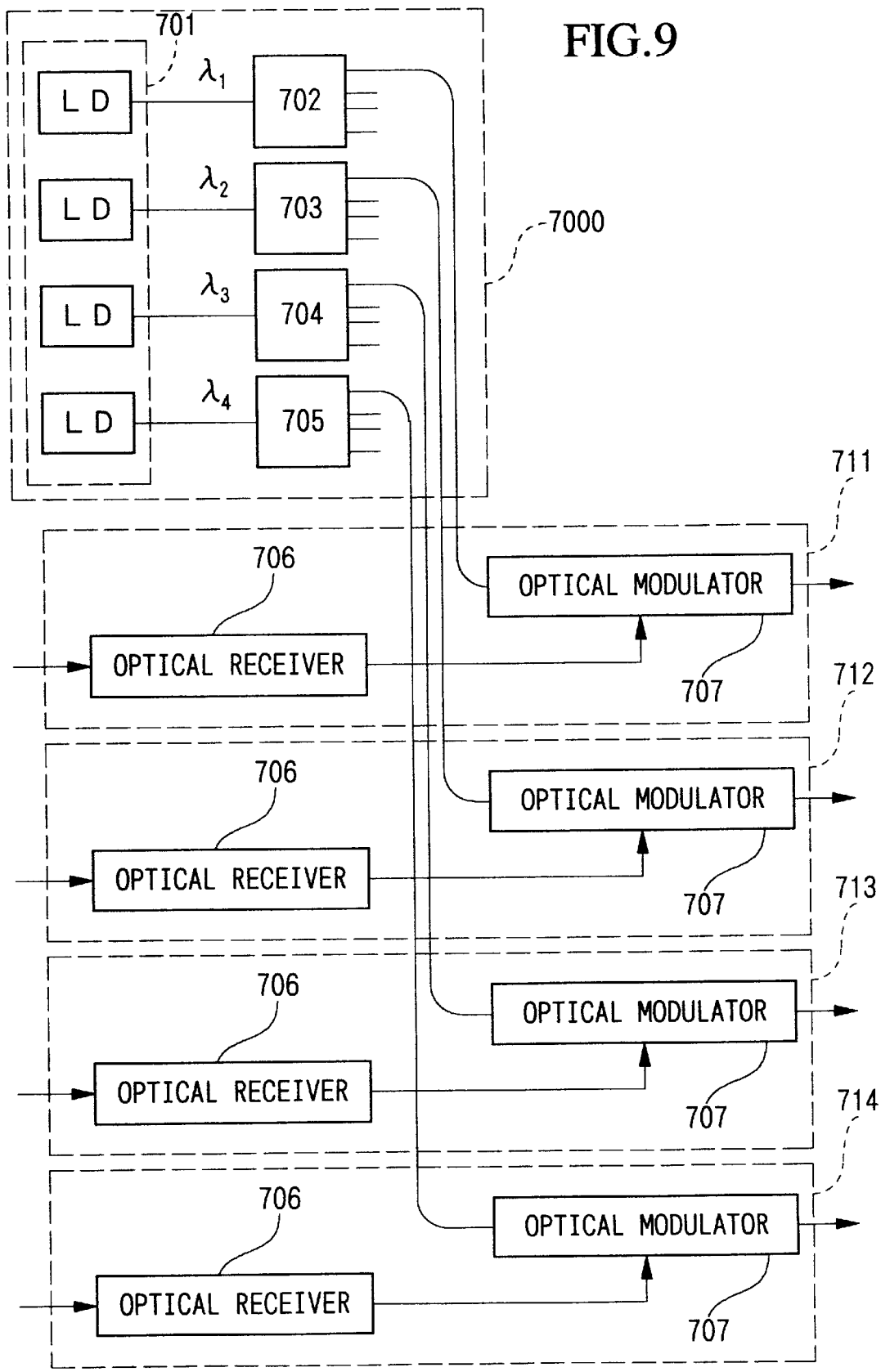
FIG. 9 shows an example of the wavelength converter.

In FIG. 9, common light source 7000 comprises semiconductor laser array 701 and 1×4 optical splitters 702–705. Each of wavelength converters 711–714 (up to "744" but not shown in the figure) consists of optical receiver 706 and optical modulator 707. In this case, for the optical modulator, same optical parts can be used regardless of the wavelength; thus, each wavelength converter can be constructed using common optical parts (or components). Therefore, regarding the arrangement of FIG. 1, if each of the optical signal selectors 411–444 and the corresponding wavelength converter (one of 711–744) are contained in the same sheath, all 16 sheathes consist of the same optical components or parts. Therefore, any sheath can be replaced (with a new sheath) at a new installation or during troubleshooting.

Embodiment of another configuration of the wavelength-division multiplexer

To multiplex 4 optical signals with different wavelengths into one optical fiber is a function necessary for wavelength-division multiplexers 81–84. Such a wavelength-division multiplexer may be constructed using small and cheap optical couplers without wavelength dependency. In this case, the multiplexer is subjected to coupling loss of "10·Log n" (n being the number of wavelengths). Also in this case, if the wavelength converter is damaged in any way and the wavelength of the optical signal output from the converter is varied, other multiplexed optical signals may be influenced by undesirable effects.

Other configuration and driving examples of the optical switching element

The case in which a Mach-Zehnder-interferometer-type is used as each optical switching element was explained with reference to FIG. 2; however, any optical switch which can set the state of a wavelength-division multiplexed light beam to be "on" or "off" and which has a desirable extinction ratio as shown in FIG. 6 may be used. For example, a self-latching single-mode optical fiber switch can be used, in which an ultra-light magnetic-film pipe is mounted to an optical fiber and this unit is driven using electromagnetic force so as to contact-break light. Detailed explanations of such an optical switch is disclosed in *Reference 6, S. Nagaoka, "Compact and High-Performance Latching Type Single-Mode Fiber Switches", Technical Report of IEICE, OQE*93-119, *OCS*93-55, pp. 67–72, 1993. It is also possible to use a Y-shaped optical switch using the thermo-optic effect, or another configuration using a semiconductor optical amplifier as an optical gate.

In FIG. 2, optical switching element arrays 100 and 110 are respectively driven by optical switch driving circuits 311 and 312 and selectors 321 and 322; however, optical switch driving circuits may be provided for each optical switching element without using selectors. In this case, the number of optical switch driving circuits increases but fine adjustment relating to the "off" state can be performed. Therefore, the extinction ratio can be improved. Here, only one optical switching element is set to be in an "on" state; thus, consumption power can also be made small in this case.

Example of other configuration of the optical combiner

In FIG. 2, optical mode combiner 301 is used as the optical combiner, which combines optical signals transmitted through plural single-mode optical fibers into one multi-mode optical fiber. However, the optical signals may be combined into a single-mode optical fiber using an ordinary optical coupler. In this case, combining loss of "10·Log(n+m−1)[dB]" is generated, in principle.

Second embodiment of configuration of the optical signal selector

If a periodic wavelength router is used as arrayed-waveguide grating wavelength router 200 shown in FIG. 2, the number of optical switching elements included in optical switching element array 110 can be decreased. Here, the periodic wavelength router has n pairs of input-output ports corresponding to the number n of wavelengths, and the wavelength-routing characteristic between the input and output ports has periodicity (or a Latin matrix characteristic). Explanations with reference to FIGS. 10 and 11 follow.

Figure 10:
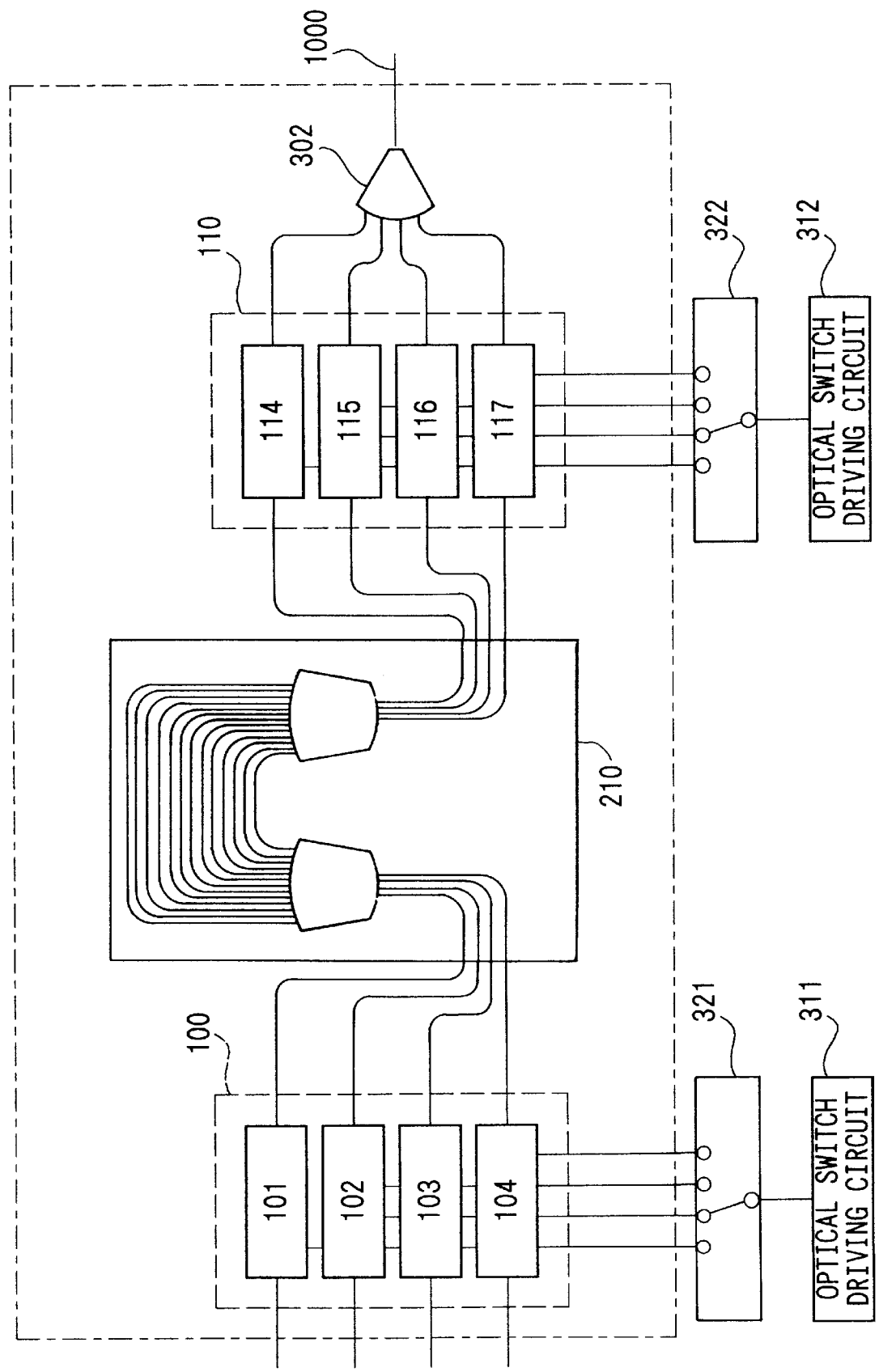
FIG. 10 shows the second embodiment of the configuration of the optical signal selector.

FIG. 10 shows the second embodiment of configuration of the optical signal selector using the above periodic wavelength router.

Differences from the first embodiment as shown in FIG. 2 are that arrayed-waveguide grating wavelength router 210 has 4 output waveguides $O_0$–$O_3$, and optical switching element array 110 consists of 4 optical switching elements 114–117, and 4×1 optical mode combiner 302 is provided as the optical combiner.

Figures 11, 12:
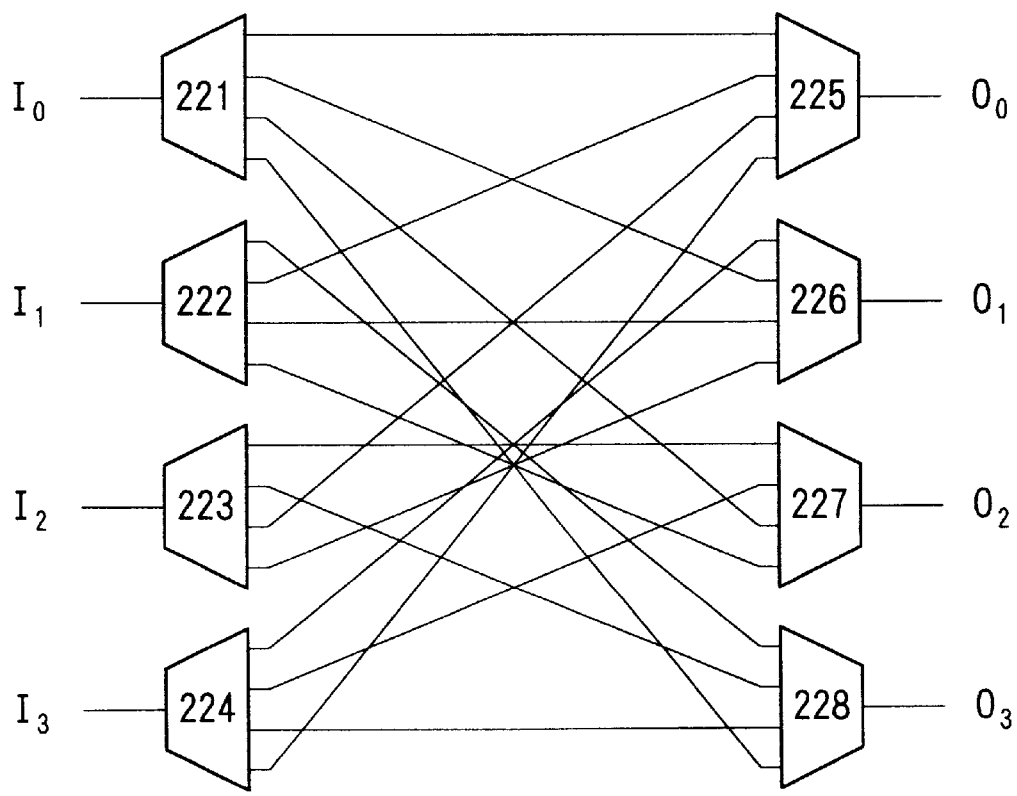
FIG. 11 shows a wavelength-routing characteristic of an arrayed-waveguide grating wavelength router with periodicity.
FIG. 12 shows the configuration of another wavelength router having the wavelength-routing characteristic as shown in FIG. 11.

Arrayed-waveguide grating wavelength router 210 is designed such that when optical signal $\lambda_k$ (k=1–4) is input into input waveguide $I_i$ (i=1–m), the input signal is routed to output waveguide $O_{(k-i) mod\ 4}$. Here, "x mod y" means "the remainder obtained by dividing x by y". That is, arrayed-waveguide grating wavelength router 210 has a wavelength-routing characteristic as shown in FIG. 11. For example, when a wavelength-division multiplexed light beam of $\lambda_1$–$\lambda_4$ is input into input waveguide $I_2$, an optical signal having wavelength $\lambda_1$ is output into output waveguide $O_3$; an optical signal having wavelength $\lambda_2$ is output into output waveguide $O^0$; an optical signal having wavelength $\lambda_3$ is output into output waveguide $O_1$; and an optical signal having wavelength $\lambda_4$ is output into output waveguide $O_2$. Therefore, four optical signals included in the wavelength-division multiplexed light beam which was input into one of 4 input waveguides are demutiplexed and respectively output into 4 output waveguides according to the relevant input waveguide and wavelengths. Here, detailed expressions and a design method relating to the periodic wavelength router are disclosed in the above Reference 4.

Generally, with a periodic wavelength router, an optical cross-connect system, in which at most n optical signals are multiplexed in at most n pairs of input-output optical fibers, can be constructed as the system shown in FIG. 1. This structure comprises a 1×$n^2$ optical splitter corresponding to each of n input optical fibers, $n^2$ optical signal selectors, $n^2$ wavelength converters, and an n×1 wavelength-division multiplexer corresponding to each of n output optical fiber. Each optical signal selector comprises a first optical switching element array consisting of n optical switching elements, a periodic wavelength router, and a second optical switching element array consisting of n optical switching elements, and an n×1 optical mode combiner. This periodic wavelength router comprises n input ports $I_1$–$I_n$ and n output ports $O_0$–$O_{n-1}$, and is designed to have a function such that when an optical signal of wavelength $\lambda_k$ (k=1–n) is input into input port $I_i$, the signal is routed to output port $O_{(k-i) mod\ n}$. Therefore, n (multiplexed) optical signals input into one of n input ports are respectively output into n output ports according to the relevant input port and wavelengths.

As explained above, the second embodiment using the periodic wavelength router has an effect that the number of optical switching elements can be reduced, in addition to the effects explained in the first embodiment of the configuration of the optical signal selector.

Additionally, the second embodiment uses arrayed-waveguide grating wavelength router 210 having a wavelength-routing characteristic as shown in FIG. 11. However, similar functions can be realized using a combination of plural wavelength-division demultiplexers 221–224 and plural wavelength-division multiplexers 225–228, as shown in FIG. 12. Optical connection between the demultiplexers 221–224 and the multiplexers 225–228 corresponds to the wavelength-routing characteristic shown in FIG. 11. That is, 4 outputs from the demultiplexer 221 are periodically connected to the multiplexers 225–228; that is, from the first input port of multiplexer 225 to the fourth input port of multiplexer 228. Here, if influences of the optical loss can be ignored, the wavelength-division demultiplexers may be replaced with optical splitters, or the wavelength-division multiplexers may be replaced with optical combiners.

Figures 13, 14:
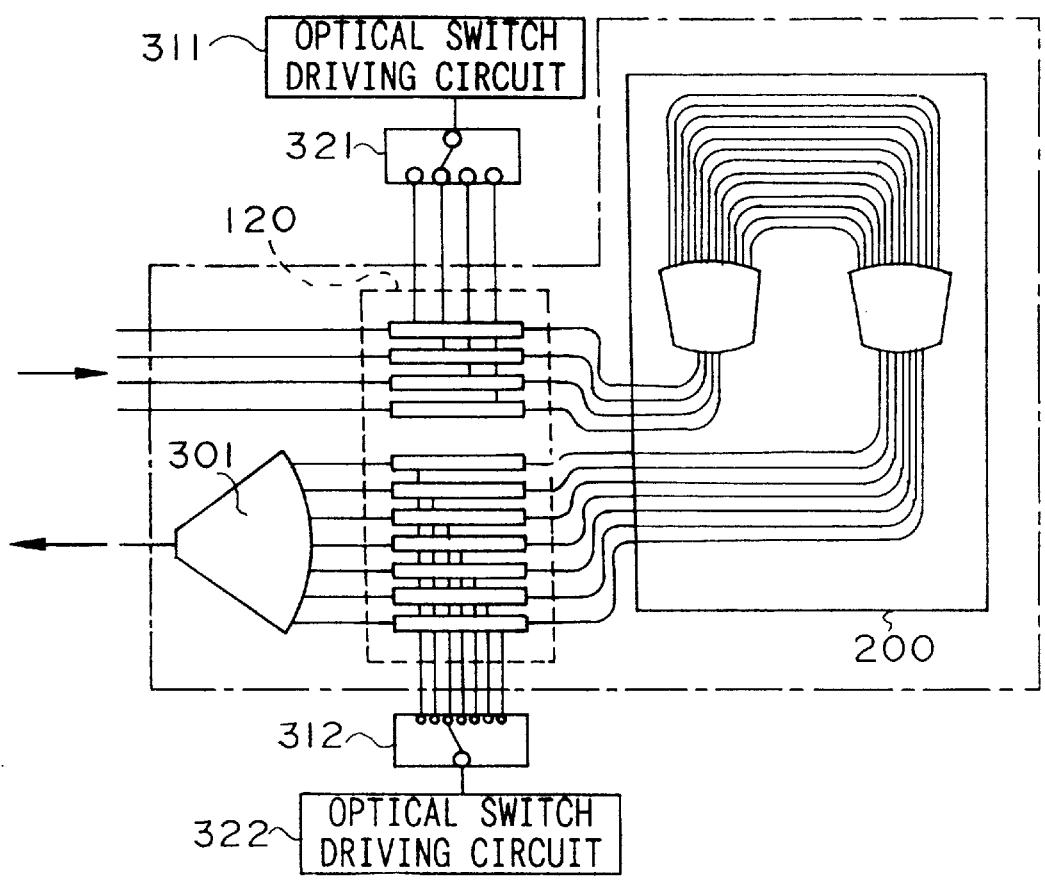
FIG. 13 shows an example of other wavelength-routing characteristics.
FIG. 14 shows the third embodiment of the configuration of the optical signal selector.

Furthermore, the routing characteristic of the wavelength router is not limited to the characteristics shown in FIG. 11, but similar optical signal selectors can be constructed using another characteristic, for example, as shown in FIG. 13. Here, a matrix in which symbols in the same line or in the same row ($\lambda_1-\lambda_4$ in FIG. 11 or 13) are all different is called a "Latin matrix". There are many other known types of Latin matrix (refer to Reference 7: R. A. Barry, et al., "*Latin Route, Design and Implementation*", Journal of Lightwave Technology, IEEE, Vol. 11, No. 5/6, pp. 891–899, 1993), and any type may be used.

Third embodiment of configuration of the optical signal selector

FIG. 14 shows the third embodiment of the configuration of the optical signal selector as a distinctive feature of the present invention.

Differences from the first embodiment as shown in FIG. 2 are that opening directions of the input waveguides and the output waveguides of arrayed-waveguide grating wavelength router 200 are formed in the same direction, and that a single optical switching element 120 consisting of 11 optical switching elements is used in place of optical switching element arrays 100 and 110 as the first and second optical switching means.

In this embodiment, in addition to the above-mentioned effects, only one optical switching element array is necessary and thus the number of necessary optical parts (or components) can be reduced. In addition, a single area is required for connecting the array to arrayed-waveguide grating wavelength router 200; thus, necessary assembling processes are reduced.

Furthermore, according to the present invention, the optical signal selector can be realized using only one kind of the optical switching element with a low extinction ratio. Therefore, it is possible to integrate optical switching elements, and thus the size and cost can be reduced. Here, a periodic wavelength router similar to the second embodiment may also be used in the present embodiment.

In the optical signal selector as shown in FIG. 14, all of optical switching element array 120 (boxed with dotted lines), arrayed-waveguide grating wavelength router 200, and 7×1 optical mode combiner 301 can be made using silica-waveguide plainer optical circuits. That is, these units can be integrated on a single silica substrate. In this case, the number of necessary optical parts and assembling processes are further reduced, and thus further reduction with respect to the size and cost can be expected.

Fourth embodiment of configuration of the optical signal selector

Figure 15:
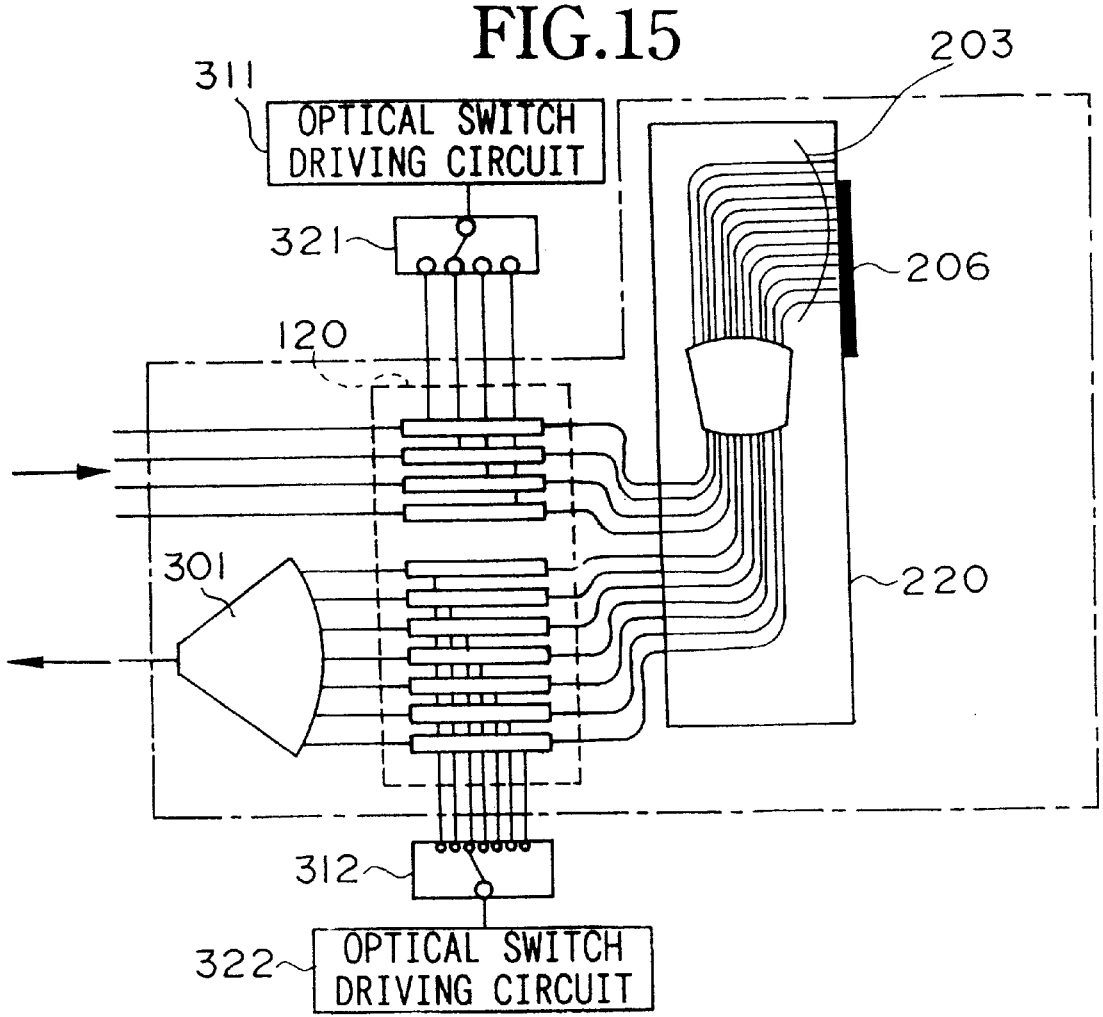
FIG. 15 shows the fourth embodiment of the configuration of the optical signal selector.

FIG. 15 shows the fourth embodiment of the configuration of the optical signal selector as a distinctive feature of the present invention.

A difference between the fourth embodiment and the third embodiment as shown in FIG. 14 is that reflective arrayed-waveguide grating wavelength router 220 is used in place of arrayed-waveguide grating wavelength router 200. As a result, further size reduction can be expected in addition to the above-mentioned effects.

Here, reflective arrayed-waveguide grating wavelength router 220 uses a symmetric property of the arrayed-waveguide grating wavelength router (which was explained using FIG. 3), and the router is realized using only one slab waveguide by adding high reflective film 206 at the midpoint of the path of waveguide array 203. Hereinafter, the principle of this reflective arrayed-waveguide grating wavelength router 220 will be explained with reference to FIGS. 16A, 16B and 17. Detailed explanations are disclosed, for example, in Reference 8, Y. Inoue, et al., "*Optical splitter/router based on silica-based planar lightwave circuits*" Technical Report of IEICE, OPE96-2, pp. 7–12, 1996.

Figure 16A:
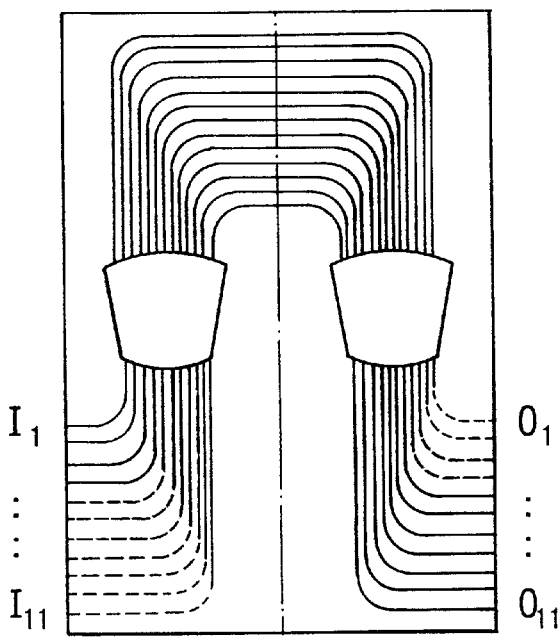
FIGS. 16A and 16B are diagrams for explaining a relationship between an 11×11 arrayed-waveguide grating wavelength router and a reflective-type router.

FIG. 16A shows an example of the 11×11 arrayed-waveguide grating wavelength router. 11 input waveguides $I_1-I_{11}$ and 11 output waveguides $O_1-O_{11}$, are provided in this configuration, and this router is designed such that when an optical signal of wavelength $\lambda_k$ is input into input waveguide $I_i$ (i=1–11), the signal is routed to output waveguide $O_{k-j+8}$. That is, this wavelength router has a wavelength-routing characteristic as shown in FIG. 17. Here, a wavelength-division multiplexed light beam (including four optical signals $\lambda_1-\lambda_4$) input into any one of input waveguides $I_1-I_4$ is demutiplexed and respectively output into $O_5-O_{11}$ among all output waveguides in accordance with the relevant input waveguide and wavelengths.

Figure 16B:
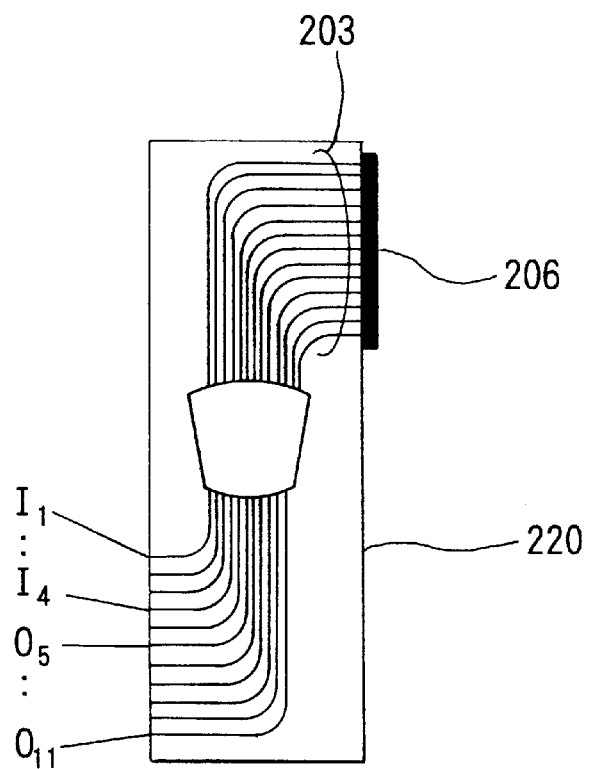
Figure 18:
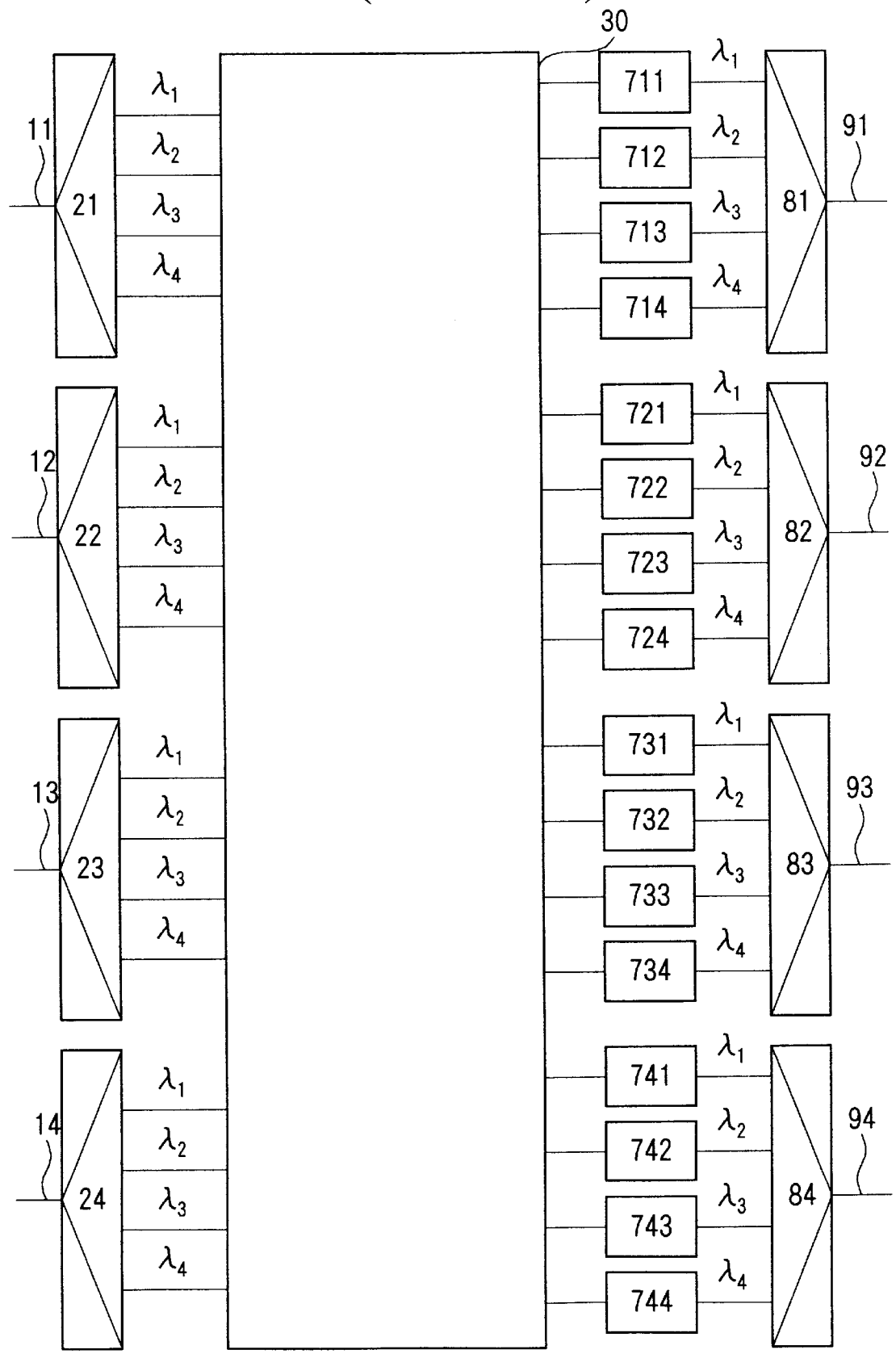
FIG. 18 shows an example of the configuration of the conventional optical cross-connect system using the wavelength-division multiplexing techniques.

Here, the arrayed-waveguide grating wavelength router as shown in FIG. 16A has a symmetrical structure with respect to the center line indicated by the alternating long-and-short-dashed line. Therefore, by adding high reflective film 206 at the midpoint in array waveguide 203 and folding the array waveguide, input waveguides $I_1-I_4$ and output waveguides $O_5-O_{11}$ can be arranged in the same direction as shown in FIG. 16B. In this way, a wavelength router having a desirable wavelength-routing characteristic can be manufactured at half the size.

What is claimed is:

1. An optical cross-connect system for re-multiplexing optical signals in a wavelength-division multiplexed light beam transmitted through each of m input optical fibers and for outputting the re-multiplexed light beams into m output optical fibers, m being an integer of 2 or more, the system comprising:

optical splitters, each splitter for splitting the wavelength-division multiplexed light beam, which was input from each input fiber, into plural wavelength-division multiplexed light beams;

optical signal selectors to which the plural wavelength-division multiplexed light beams split by the optical splitters are input, the wavelength-division multiplexed light beam from each of the m input optical fibers being input into each optical signal selector, the selector for selecting one of m input wavelength-division multiplexed light beams and further selecting and outputting an optical signal having a wavelength from the selected wavelength-division multiplexed light beam;

wavelength converters, each converter for converting the optical signal, which was output from each optical signal selector, into an optical signal with a predetermined wavelength; and wavelength-division multiplexers, respectively connected to the m output optical fibers, for wavelength-division multiplexing optical signals output from the wavelength converters and respectively outputting multiplexed light beams to the output optical fibers, and each optical signal selector comprising:

a first optical switching means having m optical paths which correspond to the m wavelength-division multiplexed light beams, for permitting only the wavelength-division multiplexed light beam passing through one of the optical paths to pass and closing the remaining paths;

a wavelength router having m input ports which are respectively connected to the m optical paths and p output ports, p being an integer of the number of wavelengths multiplexed in the wavelength-division multiplexed light beam or more, the router for demultiplexing the wavelength-division multiplexed light beam, which passed through the first optical switching means, into optical signals having different wavelengths, and for respectively outputting these demultiplexed optical signals into different output ports, the router having a routing characteristic such that the output port to which each demultiplexed signal is output is different for each input port;

a second optical switching means having p optical paths which are connected to the p output ports of the wavelength router, for permitting only the optical signal passing through one of the optical paths to pass and closing the remaining paths; and optical combiner for combining the p optical paths of the second optical switching means into one optical path.

2. An optical cross-connect system as claimed in claim 1, wherein the first and second optical switching means are integrated on a single substrate.

3. An optical cross-connect system as claimed in claim 2, wherein the wavelength router and the optical combiner are also integrated on the substrate.

4. An optical cross-connect system as claimed in claim 1, further comprising a two-dimensional fiber array as means for combining the optical splitters and the optical signal selectors, in which m(tape-type n-core optical fibers) at the input side and n(tape-type m-core optical fibers) at the output side, n being the number of wavelengths multiplexed in the wavelength-division multiplexed light beam, are layered at both input and output sides, and both sides are connected to each other such that tape directions of the two sides cross each other in an essentially orthogonal relationship.

5. An optical cross-connect system as claimed in claim 1, wherein the wavelength router of the optical signal selector is an arrayed-waveguide grating wavelength router.

6. An optical cross-connect system as claimed in claim 2, wherein the wavelength router of the optical signal selector is an arrayed-waveguide grating wavelength router.

7. An optical cross-connect system as claimed in claim 3, wherein the wavelength router of the optical signal selector is an arrayed-waveguide grating wavelength router.

8. An optical cross-connect system as claimed in claim 4, wherein the wavelength router of the optical signal selector is an arrayed-waveguide grating wavelength router.

9. An optical cross-connect system as claimed in claim 5, wherein the arrayed-waveguide grating wavelength router is reflective type.

10. An optical cross-connect system as claimed in claim 5, wherein the wavelength router of the optical signal selector is a periodic wavelength router.

* * * * *